United States Patent [19]

Whitehurst

[11] Patent Number: 5,143,879
[45] Date of Patent: Sep. 1, 1992

[54] METHOD TO RECOVER ORGANIC TEMPLATES FROM FRESHLY SYNTHESIZED MOLECULAR SIEVES

[75] Inventor: D. Duayne Whitehurst, Titusville, N.J.

[73] Assignee: Mobil Oil Corporation, Fairfax, Va.

[21] Appl. No.: 732,515

[22] Filed: Jul. 18, 1991

[51] Int. Cl.$^5$ .................. B01J 29/00; B01J 37/08
[52] U.S. Cl. .................... 502/85; 423/328; 423/329
[58] Field of Search ........... 502/85; 423/328 T, 329 T

[56] References Cited

U.S. PATENT DOCUMENTS

| | | | |
|---|---|---|---|
| 3,355,246 | 11/1967 | Kuehl | 23/113 |
| 3,791,964 | 2/1974 | Kuehl | 208/120 |
| 4,176,090 | 11/1979 | Vaughan et al. | 252/455 Z |
| 4,216,188 | 8/1980 | Shabria et al. | 423/118 |
| 4,248,739 | 2/1981 | Vaughan et al. | 252/455 R |
| 4,310,440 | 1/1982 | Wilson et al. | 252/435 |
| 4,335,020 | 6/1982 | Chu et al. | 502/85 |
| 4,367,163 | 1/1983 | Pinnavaia et al. | 252/455 R |
| 4,385,994 | 5/1983 | Wilson et al. | 210/689 |
| 4,440,871 | 4/1984 | Lok et al. | 502/214 |
| 4,673,559 | 6/1987 | Derouane et al. | 423/306 |
| 4,831,006 | 5/1989 | Aufdembrink | 502/242 |
| 4,859,648 | 8/1989 | Landis et al. | 502/242 |
| 4,880,611 | 11/1989 | von Ballmoos et al. | 423/306 |
| 4,916,097 | 4/1990 | Chu et al. | 502/85 |

FOREIGN PATENT DOCUMENTS 2109402 6/1983 United Kingdom ........ 502/85

OTHER PUBLICATIONS

Kirk-Othmer Encyclopedia of Chemical Technology, 3rd ed., vol. 20, pp. 766-781.
Wefers, K., et al., "Oxides and Hydroxides of Aluminum", Tech. Paper #19, revised, Alcoa Res., pp. 54-59 (1987).
Moore, P. B., et al. "An X-ray Structural Study of Cacoxenite, a Mineral Phosphate", Nature vol. 306, No. 5941 (1983).
Szostak, R. et al., "Ultralarge Pore Molecular Sieves: Characterization of the 14 Angstroms Pore Mineral, Cacoxenite", Zeolites: Facts, Figures and Future, Elseview Sc. Pub., B.V. (1987).
d'Yvoire, F., "Memoir: Study of Aluminum Phosphate and Trivalent Iron", (1961), pp. 1762-1776.
R. Szostak, "Molecular Sieves, Principles of Synthesis and Identification", 79 (1989).
A. Dyer, "An Introduction to Zeolite Molecular Sieves" 60, (1988).
B. M. Lok et al., "The Role of Organic Molecules in Molecular Sieve Synthesis" 3 Zeolites 282 (1983).
J. P. Teas "Graphic Analysis of Resin Solubilities 40" J. Paint Technology 19 (Jan. 1968).

Primary Examiner—Carl F. Dees
Attorney, Agent, or Firm—Alexander J. McKillop; Charles J. Speciale; Robert B. Furr, Jr.

[57] ABSTRACT

This invention relates to a method for removing organic directing agents from as-synthesized molecular sieves comprising:
(a) contacting said porous synthetic material with polar solvent having dissolved therein at least one cation donor, wherein said polar solvent is characterized by solubility parameters $f_d$, $f_p$, and $f_h$ wherein the values of solubility parameters $f_d$, $f_p$, and $f_h$ are defined by a circular region of the Teas diagram of Figure 41, said circular region having a center defined by the coordinates ($f_d=46$, $f_p=22$, $f_h=32$) and encompassing about 21 percent of the total area of said Teas diagram of Figure 41, and wherein each of said sorbed templating agent and said cation donor are soluble in said polar solvent; and
(b) holding said porous synthetic material, said nonaqueous polar solvent, and said cation donor of step (a) in contact at elevated temperature for a period of time sufficient to absorb at least a portion of said templating agent from said synthetic material.

26 Claims, 32 Drawing Sheets

PREFERRED SOLVENT PARAMETERS

W = WATER
M = METHANOL
E = ETHANOL
D = DIETHYL ETHER
P = TRICHLOROETHYLENE
C = CHLOROFORM
B = BENZENE
T = TOLUENE
H = HEXANE
A = AZEOTROPES

DIETHYL ETHER

SOLVENT PARAMETERS FOR CHLOROFORM

METHANOL/BENZENE AZEOTROPE

HEPTANE/ETHANOL AZEOTROPE

METHANOL/TOLUENE AZEOTROPE

METHANOL/TRICHLOROETHYLENE AZEOTROPE

ETHANOL/TRICHLOROETHYLENE AZEOTROPE

BENZENE/ETHANOL AZEOTROPE

HEPTANE/N-BUTYL ALCOHOL AZEOTROPE

N-PROPANOL/HEXANE AZEOTROPE

CYCLOHEXANE/1-PROPANOL AZEOTROPE

SOLVENT PARAMETERS OF CHLORIDES

SOLUBILITY PARAMETERS FOR AMINES

SOLVENT PARAMETERS OF ALCOHOL AZEOTROPES

H = HEPTANE
X = HEXANE
C = CYCLOHEXANE
B = BENZENE
T = TOLUENE
E = TRICHLOROETHYLENE

AZEOTROPE OF ACETIC ACID/CHLOROBENZENE

PREFERRED SOLVENT PARAMETERS

W = WATER
M = METHANOL
E = ETHANOL
D = DIETHYL ETHER
P = TRICHLOROETHYLENE
C = CHLOROFORM
B = BENZENE
T = TOLUENE
H = HEXANE
A = AZEOTROPES

METHOD TO RECOVER ORGANIC TEMPLATES FROM FRESHLY SYNTHESIZED MOLECULAR SIEVES

FIELD OF THE INVENTION

This invention relates to a method of synthesizing molecular sieves useful as catalysts and sorbents. More particularly, this invention relates to a method for recovering a templating agent from such materials, and further discloses synthesis of an ultra-large pore molecular sieve for which the recovery process of the invention has been found to be unusually beneficial.

BACKGROUND OF THE INVENTION

Porous inorganic solids have found great utility as catalysts and separations media for industrial application. These materials are commonly synthesized using organic cationic templates in the synthesis mixture. The cost of these templates in many instances represents a major fraction of the overall cost of the molecular sieve because, prior to the advent of the present invention, it has not been possible to remove the template from the as-synthesized molecular sieve without destroying the template. Because oxidation of the organic template effectively removes residual organic template from the pores of the synthetic material, the freshly synthesized molecular sieve material is subjected to high temperatures in an controlled oxygen-containing atmosphere to slowly burn off the residual organic template. This step is commonly referred to in the art of molecular sieve synthesis as calcining. Inorganic cations may be removed, either before or after calcining, from the as-synthesized molecular sieve by aqueous ion exchange. Unfortunately, however, aqueous ion-exchange techniques have proven largely ineffective for removing the organic templating agents from layered and other controlled pore synthetic materials.

The synthetic porous materials which can be synthesized in accordance with the present invention are characterized by substantially open microstructure, and the terms "porous material" and "molecular sieve" are used interchangeably to describe this class of materials. The openness of the microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100-250 Angstrom particles of dense amorphous silica (*Kirk-Othmer Encyclopedia of Chemical Technology*, 3rd Edition, Vol. 20, John Wiley & Sons, New York, p. 766-781, 1982), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides or Aluminum", Technical Paper No. 19 Revised, Alcoa Research Laboratories, p. 54-59, 1987). Since, in the case of either material, there is no long range order controlling the sizes of pores in the material, the variability in pore size is typically quite high. The sizes of pores in these materials fall into a regime called the mesoporous range, which, for the purposes of this application, is from about 13 to 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g. $AlO_4$, in which the tetrahedra are cross-linked by the sharing of oxygen atoms whereby the ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion in the crystal of a cation, for example, an alkali metal or an alkaline earth metal cation. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to the limits of present analytical measurement techniques. U.S. Pat. No. 3,941,871 (Re. 29,948) discloses a porous crystalline silicate made from a reaction mixture containing no deliberately added alumina in the recipe and exhibiting the X-ray diffraction pattern characteristic of ZSM-5. U.S. Pat. Nos. 4,061,724; 4,073,865 and 4,104,294 describe crystalline silicate of varying alumina and metal content. Aluminum phosphates are taught in U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society.* No. 392, "Study of Aluminum Phosphate and Trivalent Iron", Jul. 6, 1961 (received), pp. 1762–1776. This material, when crystalline, is identified by the JCPDS International Center for Diffraction Data card number 15-274. Once heated at about 110° C., however, the d'Yvoire material becomes amorphous or transforms to the aluminophosphate form of tridymite.

Compositions comprising crystals having a framework topology after heating at 110° C. or higher giving an X-ray diffraction pattern consistent with a material having pore windows formed by 18 tetrahedral members of about 12-13 Angstroms in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356-358 (1983) to have a framework structure containing very large channels with a calculated free pore diameter of 14.2 Angstroms. R. Szostak et al., *Zeolites: Facts, Figures, Future,* Elsevier Science Publishers B.V., 1989, present work showing cacoxenite as being very hydrophilic, i.e. adsorbing non-polar hydrocarbons only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorous, i.e. silicoaluminophosphates of particular structures are taught in U.S. Pat. No. 3,355,246 (i.e. ZK-21) and U.S. Pat. No. 3,791,964 (i.e. ZK-22). Other teachings of silicoaluminophosphates and their synthesis include U.S. Pat. No. 4,673,559 (two-phase synthesis method); U.S. Pat. No. 4,623,527 (MCM-10); U.S. Pat. No. 4,639,358 (MCM-1); U.S. Pat. No. 4,647,442 (MCM-2); U.S. Pat. No. 4,664,897 (MCM-4); U.S. Pat. No. 4,638,357 (MCM-5); and U.S. Pat. No. 4,632,811 (MCM-3).

A method for synthesizing crystalline metalloaluminophosphates is shown in U.S. Pat. No. 4,713,227, and an antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, tritita-nates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Scientific evaluations as well as commercial applications require the production of substantial quantities of these porous synthetic materials. Thus it would be highly desirable to provide a process for recovering organic templating agents from as-synthesized porous synthetic materials to reduce manufacturing costs while eliminating emissions associated with calcining.

SUMMARY OF THE INVENTION

The present invention provides, in a first aspect a method for recovering a templating agent from a porous synthetic material having said templating agent sorbed within pores of said porous synthetic material comprising the steps of:

(a) contacting said porous synthetic material with polar solvent having dissolved therein at least one cation donor, wherein said polar solvent is characterized by solubility parameters $f_d$, $f_p$, and $f_h$, and wherein the values of solubility parameters $f_d$, $f_p$, and $f_h$ are defined by a circular region of the Teas diagram of FIG. 41, said circular region having a center defined by the coordinates ($f_d=46$, $f_p=22$, $f_h=32$) and emcompassing about 21 percent of the total area of said Teas diagram of FIG. 41, and wherein each of said sorbed templating agent and said cation donor are soluble in said polar solvent; and (b) holding said porous synthetic material, said polar solvent and cation donor of step (a) in contact at elevated temperature for a period of time sufficient to desorb at least a portion of said templating agent from said synthetic material.

The invention provides, in a second aspect, a method for recovering a directing agent from a porous synthetic material having said templating agent sorbed within pores of said molecular sieve comprising the steps of:

(a) contacting said porous synthetic material with an extraction solvent having dissolved therein at least one cation donor, said extraction solvent characterized by solubility parameters $f_d$, $f_p$, and $f_h$, which are defined by the area of the larger circle of the Teas diagram of FIG. 41, wherein each of said sorbed templating agent and said cation donor are soluble in said extraction solvent; and (b) holding said porous synthetic material, said extraction solvent, and said cation donor of step (a) in contact at elevated temperature for a period of time sufficient to desorb at least a portion of said templating agent from said synthetic material.

The pH of the solvent mixture is suitably from about 0.1 to about 15, preferably from about 0.5 to about 5. Extraction temperature is preferably from about 50° to about 150° C., more preferably from about 70° C. to about 100° C. The cation donor may comprise any suitable compound soluble in the solvent mixture, and preferably comprises an inorganic acid or salt of said inorganic acid, for example, an ammonium salt. Suitable solvents include polar solvents, examples of which may be selected from the group consisting of ethers, esters, alcohols, amines, halogenated hydrocarbons, and carboxylic acids.

In a particularly preferred embodiment, the extraction solvent comprises a two-component azeotrope having a boiling point lower than that of the recovered organic templating agent to facilitate fractionation of the enriched extraction solvent to recover the templating agent for reuse.

Additional synthetic materials which may be purified in accordance with the present invention include not only zeolites, but also pillared silicates and/or clays; aluminophosphates, e.g. ALPO-5, VPI-5; silicoaluminophosphates, e.g. SAPO-5, SAPO-37, SAPO-31, SAPO-40, SAPO-41; and other metal aluminophosphates. These are variously described in U.S. Pat. Nos. 4,440,871; 4,554,143; 4,567,029; 4,666,875; and 4,742,033.

The invention finds particular utility in producing a novel synthetic composition of matter comprising an ultra-large pore crystalline phase, which is useful both a sorbent and as a catalyst component for conversion of organic and inorganic compounds contacted therewith. This crystalline material generally comprises a composition of matter comprising an inorganic, porous, non-layered crystalline phase material exhibiting, after calcination, an X-ray diffraction pattern with at least one peak at a d-spacing greater than about 18 Angstrom Units with a relative intensity of 100, and a benzene adsorption capacity of greater than 15 grams benzene per 100 grams of said material at 50 torr and 25° C.

The invention is uniquely beneficial in producing a particular embodiment of the novel synthetic composition described above, which particular embodiment is referred to hereinafter as MCM-41. MCM-41 is a composition of matter comprising an inorganic, porous crystalline phase material having a hexagonal arrangement of uniformly-sized pores at least about 13 Angstroms diameter and exhibiting, after calcination, a hexagonal electron diffraction pattern that can be indexed with a $d_{100}$ value greater than 18 Angstrom Units.

DETAILED DESCRIPTION

Figure 1:
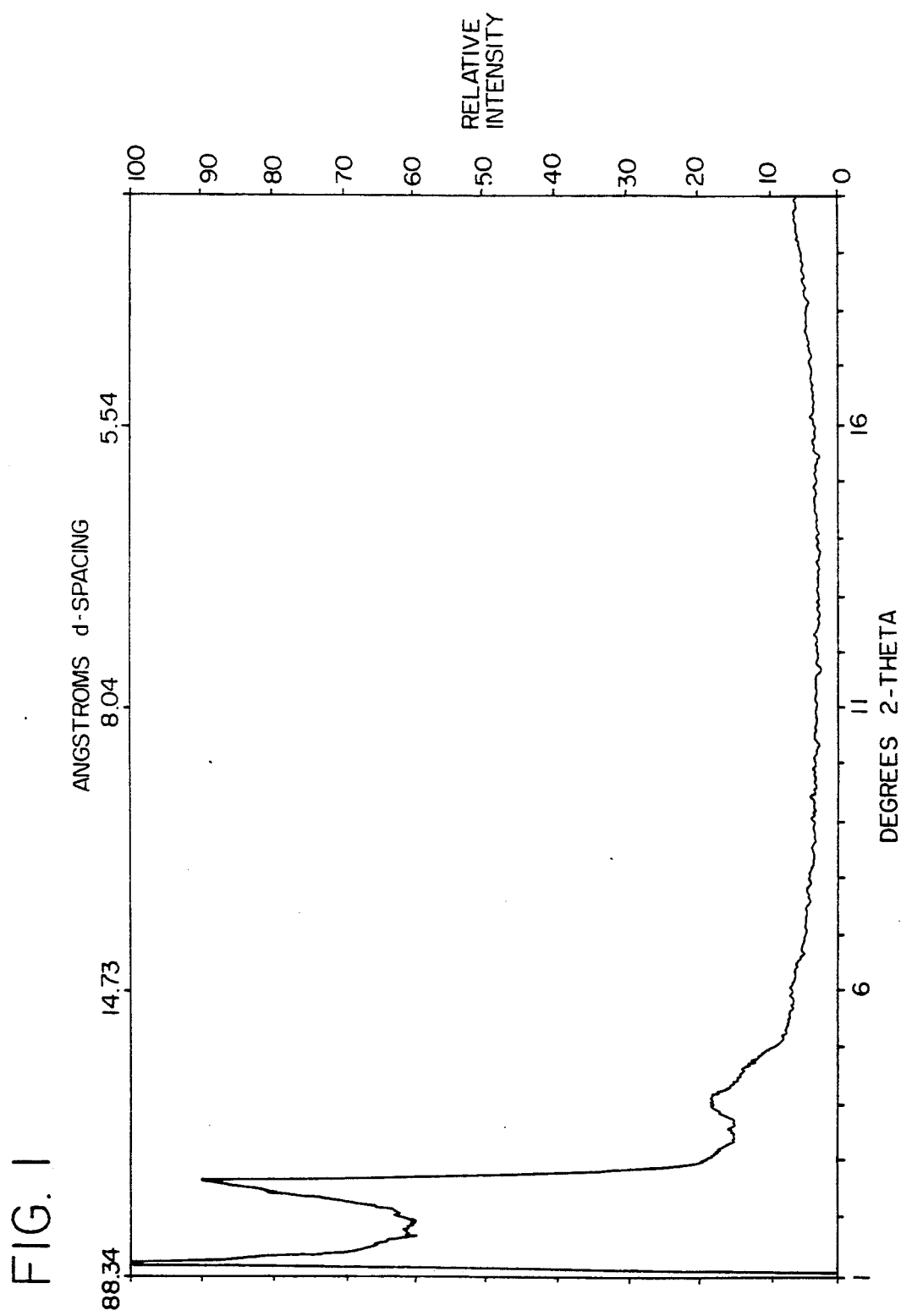
FIGS. 1-15 are X-ray diffraction patterns of products of Examples 1-14 and 16, respectively, hereinafter presented.

It has now been found that many widely used organic templating agents can be removed from porous synthetic materials in their as-synthesized state under special conditions using an extraction solvent system in accordance with the present invention. As used herein, the terms "organic directing agent" and "organic templating agent" are synonymous, and are used in their usual sense. For a discussion of zeolite directing agents as well as a list of examples, see R. Szostak *Molecular Sieves, Principles of Synthesis and Identification* 79 (1989), which is incorporated by references as if set forth at length herein.

The directing agent removal technique of the present invention requires that the solvent dissolve both the salt of the organic cation as well as the replacing ion, which is typically a proton. While not presented to limit the scope of the invention by a recitation of theory, solvent in some instances is believed to aid the dissociation of oleophilic interactions between alkyl groups of associated organic cations, or between siliceous inorganic catalyst structural components and the aliphatic groups of the organic cation templates. The temperature of the separation is adjusted such that the organic templates are not thermally decomposed during the exchange, but temperatures above 50° C. are preferred as oleophilic interactions appear to be more readily disrupted at elevated temperatures.

Templating Agents

Templating or directing agents substantially fill pores of as-synthesized molecular sieves, and must be removed to provide access to the pores for catalysis on sorption. Bulky organic bases which are favored as directing agents include cetyltrimetylammonium (CTMA), myristyltrimethylammonium ($C_{14}$TMA), decyltrimethylammonium, cetyltrimethylphosphonium, octadecyltrimethylphosphonium, benzyltrimethylammonium, cetylpyridinium, dodecyltrimethylammonium, and dimethyldidodecylammonium, merely to name a few. The templating action of various organic entitles is also discussed in A. Dyer *An Introduction to Zeolite Molecular Sieves* 60 (1988), as well as in B. M. Lok et al., The Role of Organic Molecules in Molecular Sieve Synthesis 3 *Zeolites* 282 (1983), which are incorporated by reference as if set forth at length herein.

Extraction Solvents

The extraction solvent of the invention comprises at least one polar solvent and at least one cation donor. The terms Suitable polar solvents and polar solvent mixtures are characterized by a particular region on a Teas diagram. For a discussion of Teas diagrams, see J. P. Teas "Graphic Analysis of Resin Solubilities 40 *J. Paint Technology* 19 (January, 1968)."

Solvents which have the required properties include both aromatic as well as aliphatic ethers (e.g., tetrahydrofuran), alcohols, amines, halogenated hydrocarbons, carboxylic acids and other polar solvents. The exchanging ion can be provided by inorganic acids or salts, such as ammonium salts. In a preferred embodiment, the water content of the extraction solvent is relatively low, and is more preferably substantially free of water.

It has been found that these solvents can, in some instances, be made even more effective by adding cosolvents such as aliphatic or aromatic hydrocarbons. Most preferred are solvents which boil below about 150° C. Particularly, solvent which boil below about 150° C. have been found to facilitate both recovery of the directing agent as well as recycle of the solvent. In accordance with the present invention, it has been found that certain azeptropic solvent mixtures having a particular set of the solubility, hydrophilic and oleophilic properties, are usually effective for extracting organic directing agent from an as-synthesized zeolite. Alcohols are particularly preferred for forming azeotropic solvent mixtures.

One particularly useful solvent/ion exchange reagent combination has been found to be the azeotropic mixture of heptane and ethanol in substantially equal proportions by weight, together with a minor amount of a cation donor such as dissolved HCl. This solvent system boils at 72° C. with constant composition, and HCl can be carried overhead with the azeotropic vapors upon fractionation to separate the extraction solvent from the organic templating agent following the extraction step.

In accordance with the present invention, it has been found that polar solvent mixtures characterized by a particular region of a Teas diagram, together with a cation donor, are unusually effective for extracting organic directing agents from an as-synthesized porous material, for example, a zeolitic material.

The method of the invention may be operated in a batch or continuous mode. Operation in accordance with the preferred embodiment markedly facilitates continuous operation as both the volatile cation donor (e.g. HCl or HBr) as well as the low-boiling azeotropic solvent mixture (e.g. heptane/ethanol, 50/50 wt./wt., b.p.=72° C.) are readily separable from commonly used organic directing agents by distillation. The condensed solvent vapors withdrawn from the distillation zone overhead condenser may then be supplemental with fresh make-up cation donor as required and recycled to extract organic directing agent from as-synthesized molecules sieve material.

The Cation Donor

The extraction process of the invention requires a cation donor which is readily soluble in the nonaqueous extraction solvent. Mineral acids and their salts readily supply such cationic species, which typically comprises $H^+$. Suitable mineral acids and salts thereof include $HCl$, $H_2SO_4$, $HNO_3$, $HBr$, $H_3PO_4$,. Preferred acids include the more volatile acids having boiling points sufficiently below the templating agent to facilitate purification and reuse of the templating agent. Examples of such volatile mineral acids include HCl and HBr. Salts useful as cation donors in the present invention include salts of Group I, II and III elements of the periodic table of the elements.

Ammonium salts, quaternary ammonium salts, and quaternary amine salts are preferred.

Addition of the cation donor in accordance with the present invention improves template recovery and is believed to preserve hydroxyl content. While not presented to limit the scope of the invention by a recitation of theory, it is believed that such preservation of hydroxyl content results in the observed improvement in ion exchange and chemical bonding of materials prepared in accordance with the present invention when compared with materials which have been calcined to remove the organic directing agent.

Synthetic Materials

The method of the present invention finds utility in recovering organic templating agents from as-synthesized synthetic porous materials. Such materials include zeolitic as well as non-zeolitic materials.

Examples of zeolites which are suitable for use with the present inventive method include zeolites ZSM-4, ZSM-12, ZSM-20, ZSM-35, ZSM-48, ZSM-50, MCM-22, TMA offretite, TEA mordenite, clinoptilolite, mordenite, REY and zeolite Beta.

Zeolite ZSM-4 is taught in British Patent No. 1,117,568; ZSM-12 in U.S. Pat. No. No. 3,832,449; ZSM-20 in U.S. Pat. No. 3,972,983; ZSM-35 in U.S. Pat. No. No. 4,016,245; ZSM-48 in U.S. Pat. No. 4,397,827; ZSM-50 in U.S. Pat. No. 4,640,849; and Beta in U.S. Pat. No. 3,308,069, each incorporated herein by reference.

Additional examples of synthetic porous materials which find utility in the present invention include ZSM-5, ZSM-11, ZSM-22, and ZSM-23. Zeolite ZSM-5 and the conventional preparation thereof are described in U.S. Pat. No. 3,702,886, the disclosure of which is incorporated herein by reference. Other preparations for ZSM-5 are described in U.S. Pat. No. Re. 29,948 (highly siliceous ZSM-5); U.S. Pat Nos. 4,100,262 and 4,139,600, the disclosure of which is incorporated herein by reference. Zeolite ZSM-11 and the conventional preparation thereof are described in U.S. Pat. No. 3,832,449, the disclosure of which is incorporated herein by reference. Zeolite ZSM-23 and the conventional preparation thereof are described in U.S. Pat. No. 4,076,842, the disclosure of which is incorporated herein by reference.

Zeolite MCM-22, and in particular its x-ray diffraction pattern, together with a detailed description of its synthesis, are set forth in U.S. Pat. No. 4,954,325 which is incorporated by reference as if set forth at length herein.

Additional molecular sieves which are useful in conjunction with the present invention include pillared silicates and/or clays; aluminophosphates, e.g. ALPO-5, VPI-5; silicoaluminophosphates, e.g. SAPO-5, SAPO-37, SAPO-31, SAPO-40, SAPO-41; and other metal aluminophosphates. These are variously described in U.S. Pat. Nos. 4,440,871; 4,554,143; 4,567,029; 4,666,875; and 4,742,033.

The method of the present invention finds particular utility in the synthesis of an inorganic, non-layered mesoporous crystalline material which has the following composition:

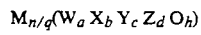
$$M_{n/q}(W_a X_b Y_c Z_d O_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; ń is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$.

In the as-synthesized form, the above crystalline material has a composition, on an anhydrous basis, expressed empirically as follows:

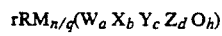
$$rRM_{n/q}(W_a X_b Y_c Z_d O_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. S-18806, 1979) and mixtures thereof.

The crystalline (i.e. meant here as having sufficient order to provide a diffraction pattern such as, for example, by X-ray, electron or neutron diffraction, following calcination with at least one peak) mesoporous material particularly useful in conjunction with this invention may be characterized by their structure, including extremely large pore windows, and high sorption capacity. The term "mesoporous" is used here to indicate crystals having uniform pores within the range of from about 13 Angstroms to about 200 Angstroms. These materials will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

Figure 19:
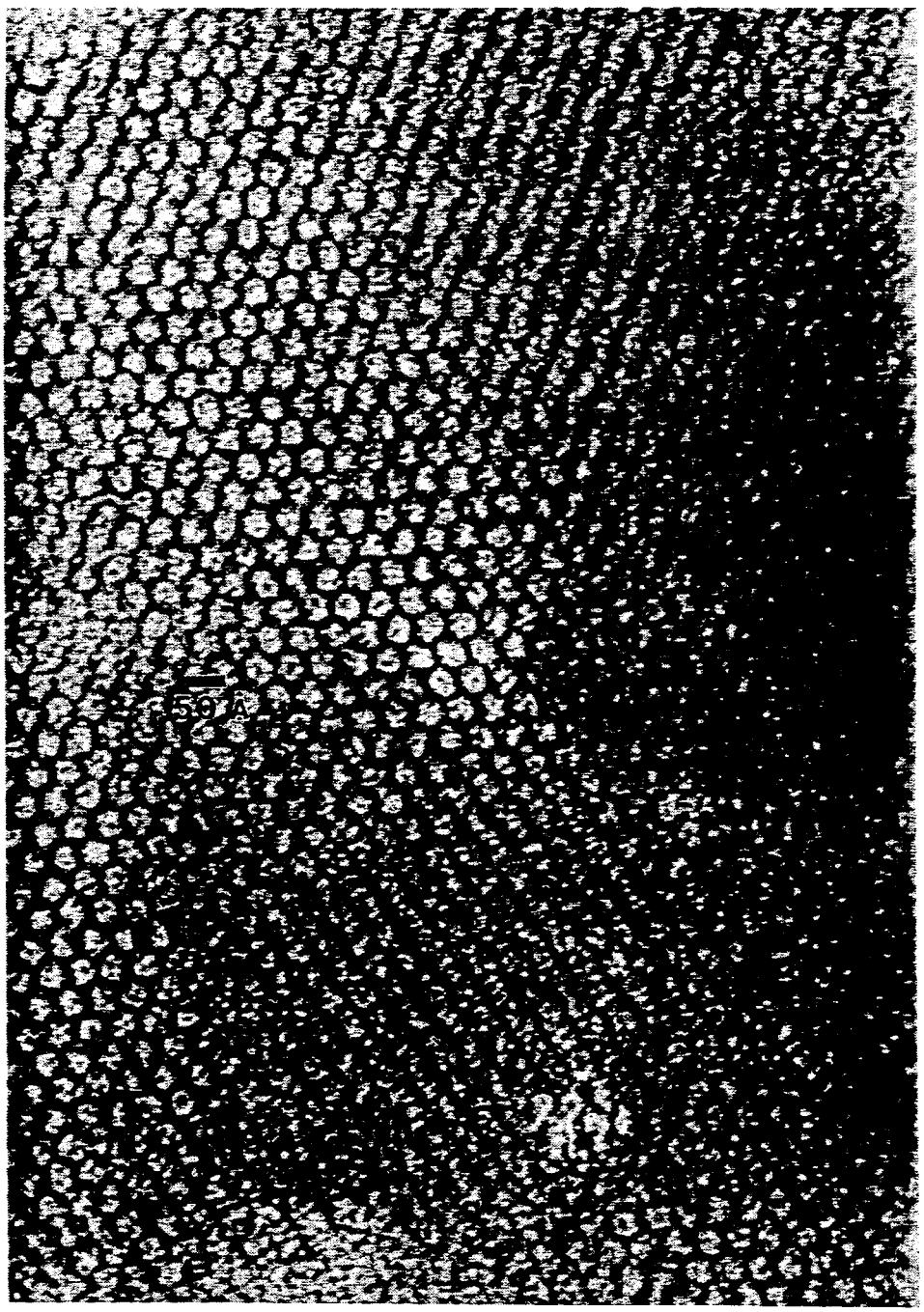
FIG. 19 is a transmission electron micrograph of the product of Example 4.
Figure 20:
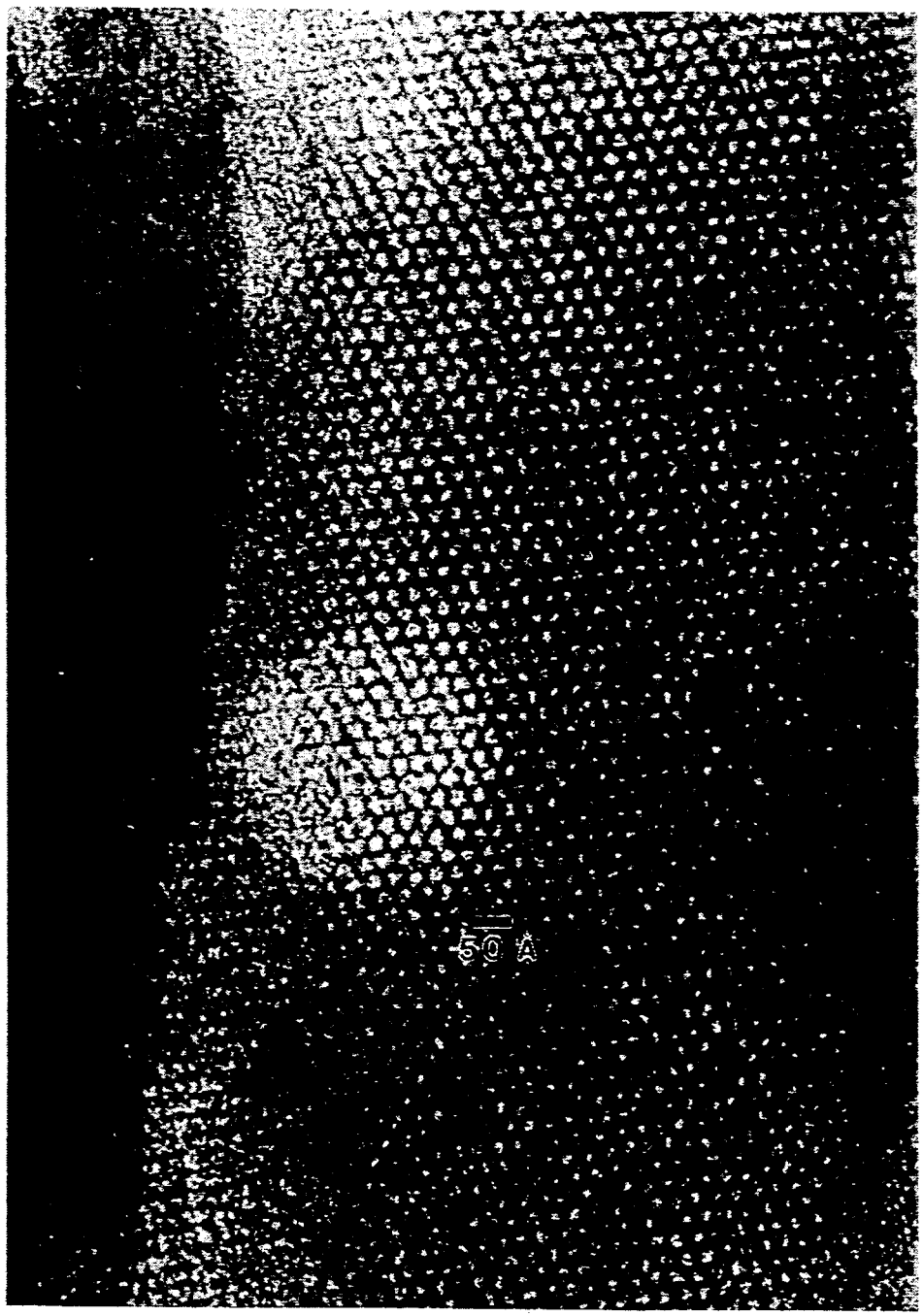
FIG. 20 is a transmission electron micrograph of the product of Example 5.
Figure 21:
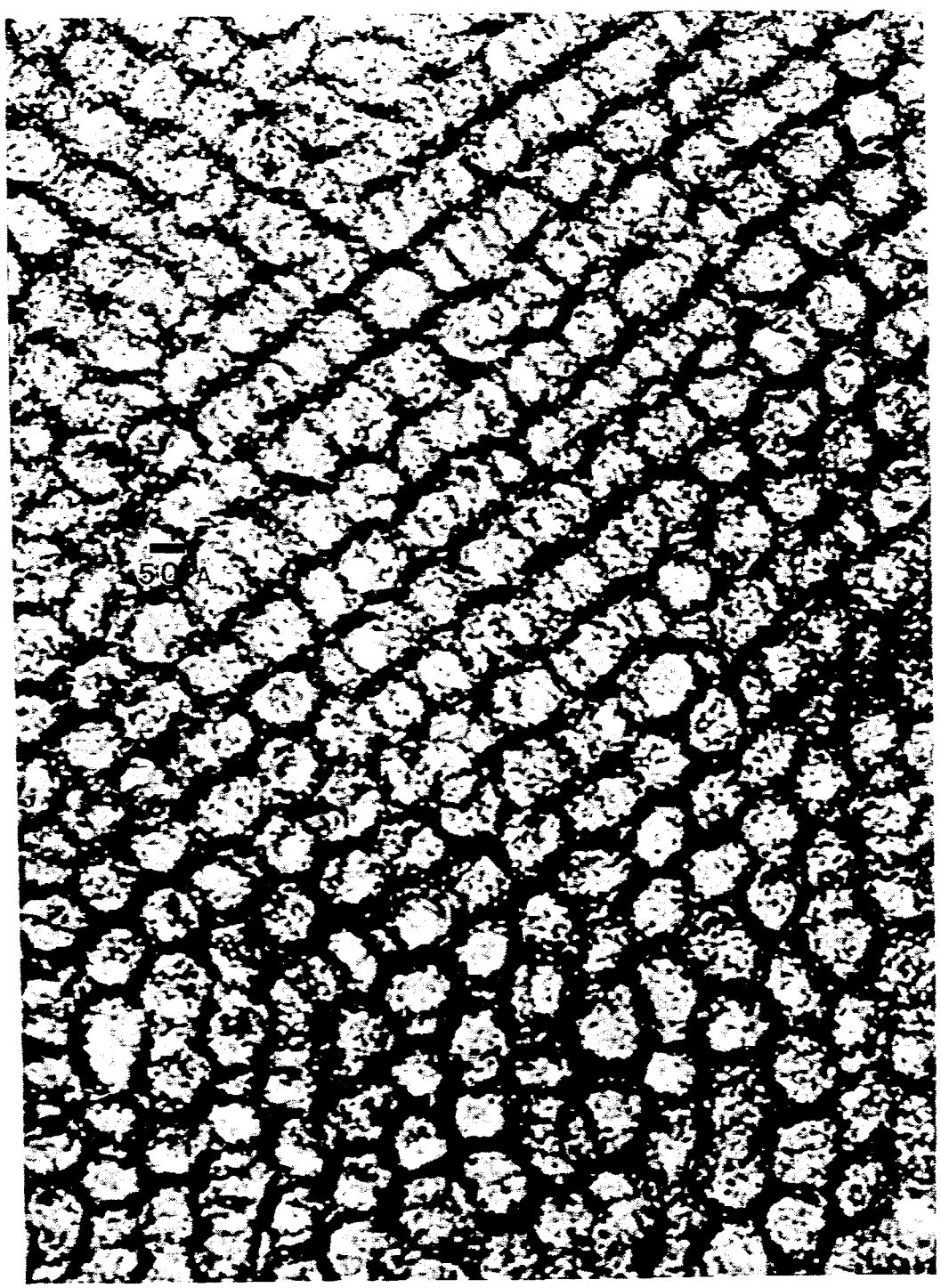
FIG. 21 is a transmission electron micrograph of the product of Example 19.

The preferred material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, $\pm 25\%$, usually $\pm 15\%$ or less of the average pore size of that phase) resemble more those of crystalline framework materials such as zeolites. The material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as $\pm 25\%$ random deviation from the average repeat distance between adjacent channels still clearly give recognizable images of the present ultra-large pore materials. Comparable variations are also observed in the $d_{100}$ values from the electron diffraction patterns. Transmission electron micrographs of materials within this working definition are shown in FIGS. 19, 20, and 21.

The most regular preparations of the preferred material give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100} = a_0 \sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their symmetry-related reflections.

In its directing agent-free form, the preferred crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this preferred material is measured on the basis of no pore blockage by incidental contaminants. For instance, the sorption test will be conducted on the crystalline material phase having any pore blockage contaminants and water removed by ordinary methods. However, it is preferred to extract the directing agent via the solvent extraction technique in accordance with the invention. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the preferred calcined crystalline non-layered material which is readily synthesized in accordance with the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the preferred calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material preferred for synthesis in accordance with the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter. The molecular sieves treated in accordance with the present invention can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The preferred synthetic crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The preferred synthetic crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The preferred synthetic crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the preferred synthetic crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the preferred synthetic crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 20 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the preferred synthetic crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/R$_2$/O is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the R$_2$/O/SiO$_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula R$_1$R$_2$R$_3$R$_4$Q$^{30}$, i.e.:

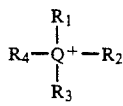

wherein Q is nitrogen or phosphorus and wherein at least one of R$_1$, R$_2$, R$_3$ and R$_4$ is aryl or alkyl of from 6 to about 36 carbon atoms, e.g. —C$_6$H$_{13}$, —C$_{10}$H$_{21}$, —C$_{16}$H$_{33}$ and —C$_{18}$H$_{37}$, or combinations thereof, the remainder of R$_1$, R$_2$, R$_3$ and R$_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein R$_1$, R$_2$, R$_3$ and R$_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The compositions preferred for synthesis accordance with the present invention are useful as catalyst components for catalyzing the conversion of organic compounds, e.g. oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications", 36 CHEMICAL INDUSTRIES, pgs. 41-61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the catalytic compositions preferred for synthesis in accordance with the present invention will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more. The present catalytic compositions are particularly useful for reactions in which the molecular weight of the feed is reduced to a lower value, i.e. to reactions involving cracking such as cracking or hydrocracking. Cracking may be conducted at a temperature of from about 200° C. to about 800° C., a pressure of from about atmospheric to about 100 psig and contact time of from about 0.1 second to about 60 minutes. Hydrocracking may be conducted at a temperature of from about 150° C. to about 550° C., a pressure of from about 100 psig to about 3000 psig, and a weight hourly space velocity of from about 0.1 hr$^{-}$ to about 100 hr$^{-1}$, with a hydrogen/hydrocarbon molar ratio of from about 0.1 to about 100.

The catalytic compositions preferred for synthesis according to the present invention may also be used for selective conversion of inorganic compounds such as oxides of nitrogen in mixtures of gases which contain nitrogen oxides ($NO_x$), for example, industrial exhaust gases and the gases formed during the oxidative regeneration of catalysts used in the processing of hydrocarbons, especially in catalytic cracking operations. The preferred porous crystalline material may be used in a matrixed or unmatrixed form for this purpose and may suitably be formed into extrudates, pellets or other shapes to permit the passage of gases over the catalyst with the minimum pressure drop. The preferred crystalline material is preferably at least partly in the hydrogen form, but it may advantageously contain a minor amount of a noble metal as a catalytic component, especially a metal of Periods 5 and 6 of Group VIIIA of the Periodic Table, especially platinum, palladium, ruthenium, rhodium, iridium or mixtures thereof. Amounts of noble metal up to about 1 weight percent are typical with lower amounts, e.g. up to about 0.1 or 0.5 weight percent being preferred.

The $NO_x$ reduction is suitably conducted by passing the gas containing the oxides of nitrogen over the preferred catalyst at an elevated temperature, typically at least 200° C., and usually within the range of 200° to 600° C. The gas mixture may be mixed with ammonia to promote reduction of the oxides of nitrogen and premixing may be conducted at a temperature of up to about 200° C. The amount of ammonia which is mixed with the gas mixture is typically within the range of 0.75 to 1.25 the stoichiometric amount, which itself varies according to the ratio of the different oxides of nitrogen in the gas mixture, as shown by the equations:

$$6NO_2 + 8NH_3 = 7N_2 + 12H_2O$$
$$6NO + 4NH_3 = 5N_2 + 6H_2O$$

The crystalline catalytic compositions of matter preferred for synthesis in accordance with the present invention may also be used for the reduction of oxides of nitrogen in gaseous mixtures in the presence of other reducing agents such as carbon or carbon monoxide. Reduction of the oxides of nitrogen in this way is of particular utility in the regeneration of fluid catalytic cracking (FCC) catalysts, since regeneration under appropriate conditions will produce the required concentrations of carbon monoxide which may then be used to reduce the proportion of $NO_x$ in the regeneration gases in the presence of the catalyst.

Because the catalytic compositions preferred for synthesis in accordance with the invention have been found to be stable, their use as cracking catalysts, e.g. in fluid catalytic cracking processes, with resid feeds will represent an especially favorable mode of utilization. Still further, they may be used in combination with one or more other catalyst components such as, for example, cracking catalysts comprising silica-alumina and/or zeolite Y, e.g. USY.

The preferred catalytic compositions are especially useful for reactions using high molecular weight, high boiling or non-distillable feeds, especially residual feeds, i.e. feeds which are essentially non-distillable or feeds which have an initial boiling point (5% point) above about 1050° F. Residual feeds which may be used with the preferred catalytic compositions include feeds with API gravities below about 20, usually below 15 and typically from 5 to 10 with Conradsen Carbon Contents (CCR) of at least 1% by weight and more usually at least 5% or more, e.g. 5-10%. In some resid fractions the CCR may be as high as about 20 weight percent or even higher. The aromatic contents of these feeds will be correspondingly high, as may the contents of heteroatoms such as sulfur and nitrogen, as well as metals. Aromatics content of these feeds will usually be at least 50 weight percent and typically much higher, usually at least 70 or 80 weight percent, with the balance being principally naphthenes and heterocyclics. Typical petroleum refinery feeds of this type include atmospheric and vacuum tower resids, asphalts, aromatic extracts from solvent extraction processes, e.g. phenol or furfural extraction, deasphalted oils, slop oils and residual fractions from various processes such as lube production, coking and the like. High boiling fractions with which the present catalytic compositions may be used include gas oils, such as atmospheric gas oils; vacuum gas oils; cycle oils, especially heavy cycle oil; deasphalted oils; solvent extracts, such as bright stock; heavy gas oils, such as coker heavy gas oils; and the like. The present catalytic materials may also be utilized with feeds of non-petroleum origin, for example, synthetic oils produced by coal liquefaction, Fischer-Tropsch waxes and heavy fractions and other similar materials.

The preferred compositions of this invention can also be used as adsorbents and separation vehicles in pharmaceutical and fine chemical applications. For example, these preferred ultra-large pore compositions may be used in the purification of drugs like insulin or be used as solid vehicles for the controlled delivery of drugs.

Another application for use of these ultra-large pore materials involves waste disposal where the extraordinary pore volumes are exploited. Therefore, at least one component can be partially or substantially totally separated from a mixture of components having differential sorption characteristics with respect to the preferred ultra-large pore composition by contacting the mixture with the composition to selectively sorb the one component. Examples of this include contacting a mixture comprising water and at least one hydrocarbon component, whereby the at least one hydrocarbon component is selectively sorbed. Another example includes selective sorption of at least one hydrocarbon component from a mixture comprising same and at least one additional hydrocarbon component. As in the case of many catalysts, it may be desired to incorporate the preferred crystal composition with another material resistant to the temperatures and other conditions employed in organic conversion processes. Such materials include active and inactive materials and synthetic or naturally occurring zeolites as well as inorganic materials such as clays, silica and/or metal oxides such as alumina, titania and/or zirconia. The latter may be either naturally occurring or in the form of gelatinous precipitates or gels including mixtures of silica and metal oxides. Use of a material in conjunction with the preferred crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the preferred crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

It may be desirable to provide at least a part of the foregoing matrix materials in colloidal form so as to facilitate extrusion of the bound catalyst components(s).

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented. In the examples, whenever sorption data are set forth for comparison of sorptive capacities for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25 C by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:
- 2.7 moles $Na_2O$
- 392 moles $SiO_2$
- 35.7 moles $(CTMA)_2O$
- 61.7 moles $(TMA)_2O$
- 6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 m²/g and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The X-ray diffraction pattern of the calcined product of this example is shown in FIG. 1. In this and the following Figures, it is noted that 10 Angstrom Units d-spacing corresponds to 8.842 degrees 2-theta (Cu K-alpha radiation) and 18 Angstrom Units corresponds to 4.909 degrees.

The product of this example may be characterized as including a very strong relative intensity line at 37.8±2.0 Angstroms d-spacing, and weak lines at 21.6±1.0 and 19.2±1.0 Angstroms. The present ultra-large pore material was demonstrated to be in the product of this example by transmission electron microscopy (TEM), which produced images of a hexagonal arrangement of uniform pores and hexagonal electron diffraction pattern with a $d_{100}$ value of about 39 Angstroms.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:
- 2.7 moles $Na_2O$
- 291 moles $SiO_2$
- 35.7 moles $(CTMA)_2O$
- 102 moles $(TMA)_2O$
- 6120 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 993 m²/g and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

Figure 2:
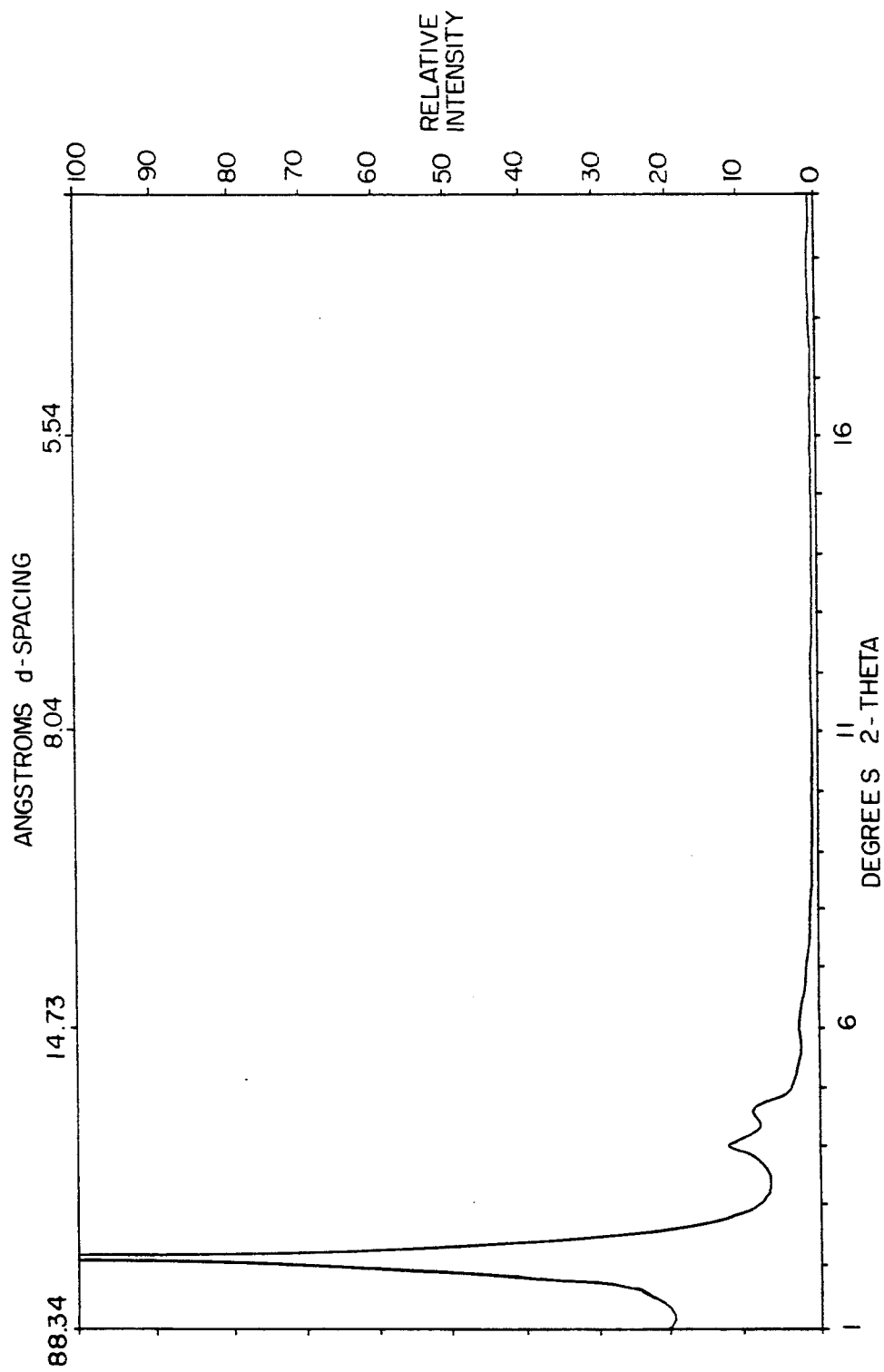

The X-ray diffraction pattern of the calcined product of this example is shown in FIG. 2. It may be characterized as including a very strong relative intensity line at 39.3±2.0 Angstroms d-spacing, and weak lines at 22.2±1.0 and 19.4±1.0 Angstroms. TEM indicated that the product contained the present ultra-large pore material.

A portion of the above product was then contacted with 100% steam at 1450° F. for two hours. The surface area of the steamed material was measured to be 440 m²/g, indicating that about 45% was retained following severe steaming.

Another portion of the calcined product of this example was contacted with 100% steam at 1250.F for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:
- 0.65 moles $Na_2O$
- 65 moles $SiO_2$
- 8.8 moles $(CTMA)_2O$
- 1.22 moles $(TPA)_2O$
- 1336 moles $H_2O$ The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:
- 0.65 moles $Na_2O$
- 65 moles $SiO_2$
- 15 moles $(CTMA)_2O$
- 1.22 moles $(TPA)_2O$
- 35.6 moles $(TMA)_2O$
- 2927 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1085 m²/g and the following equilibrium adsorption capacities in grams/100 grams:

| | |
|---|---|
| $H_2O$ | 11.5 |
| Cyclohexane | >50 |
| n-Hexane | 39.8 |
| Benzene | 62 |

Figure 3:
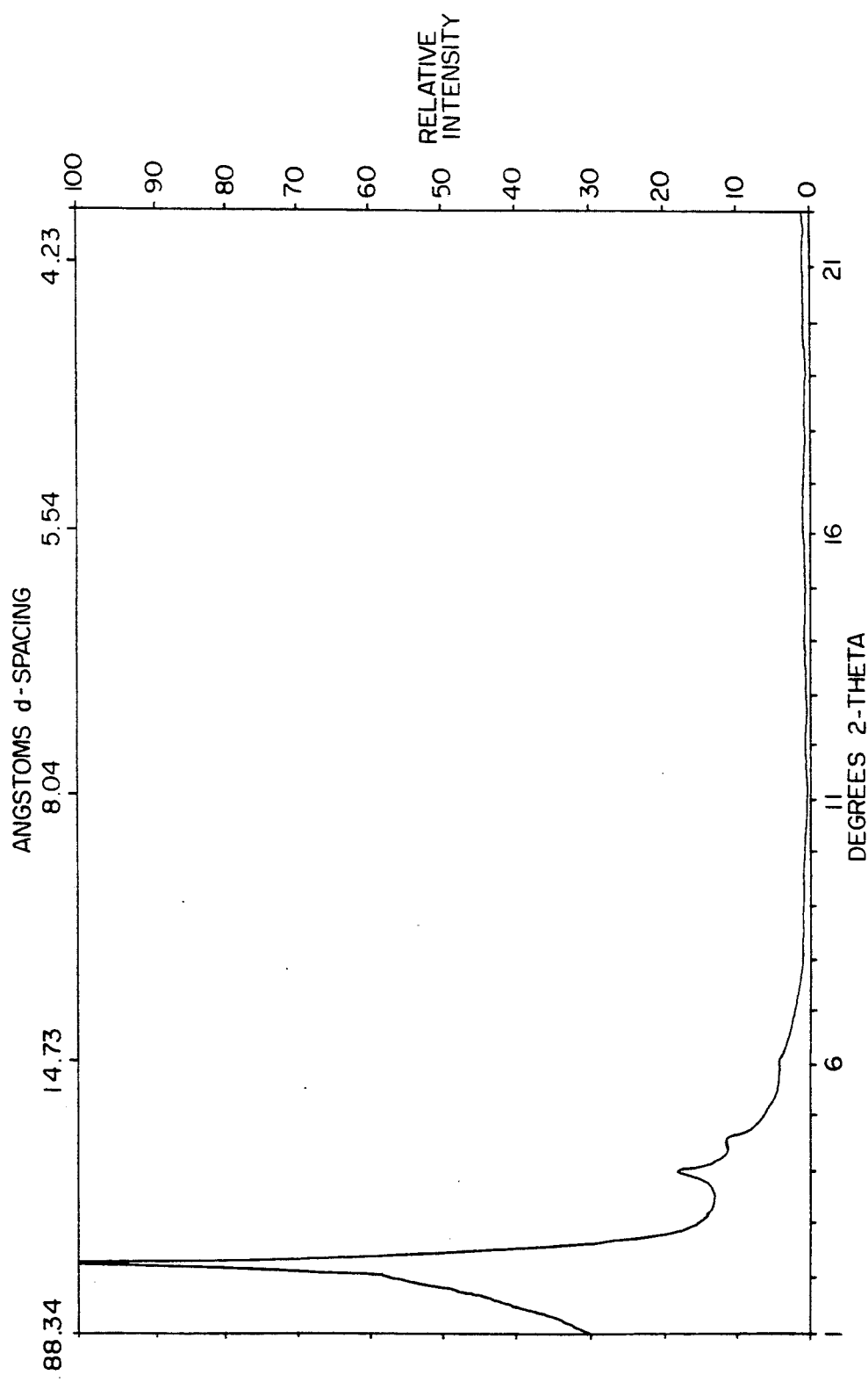

The X-ray diffraction pattern of the calcined product of this example is shown in FIG. 3. The product of this example may be characterized as including a very strong relative intensity line at 38.2±2.0 Angstroms d-spacing, and weak lines at 22.2±1.0 and 19.4±1.0 Angstroms. TEM indicated the product contained the present ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

0.23 moles $Na_2O$
33.2 moles $SiO_2$
6.1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 $m^2/g$ and the following equilibrium adsorption capacities in grams/100 grams:

| | |
|---|---|
| $H_2O$ | 6.3 |
| Cyclohexane | >50 |
| n-Hexane | 49.1 |
| Benzene | 66.7 |

Figure 4:
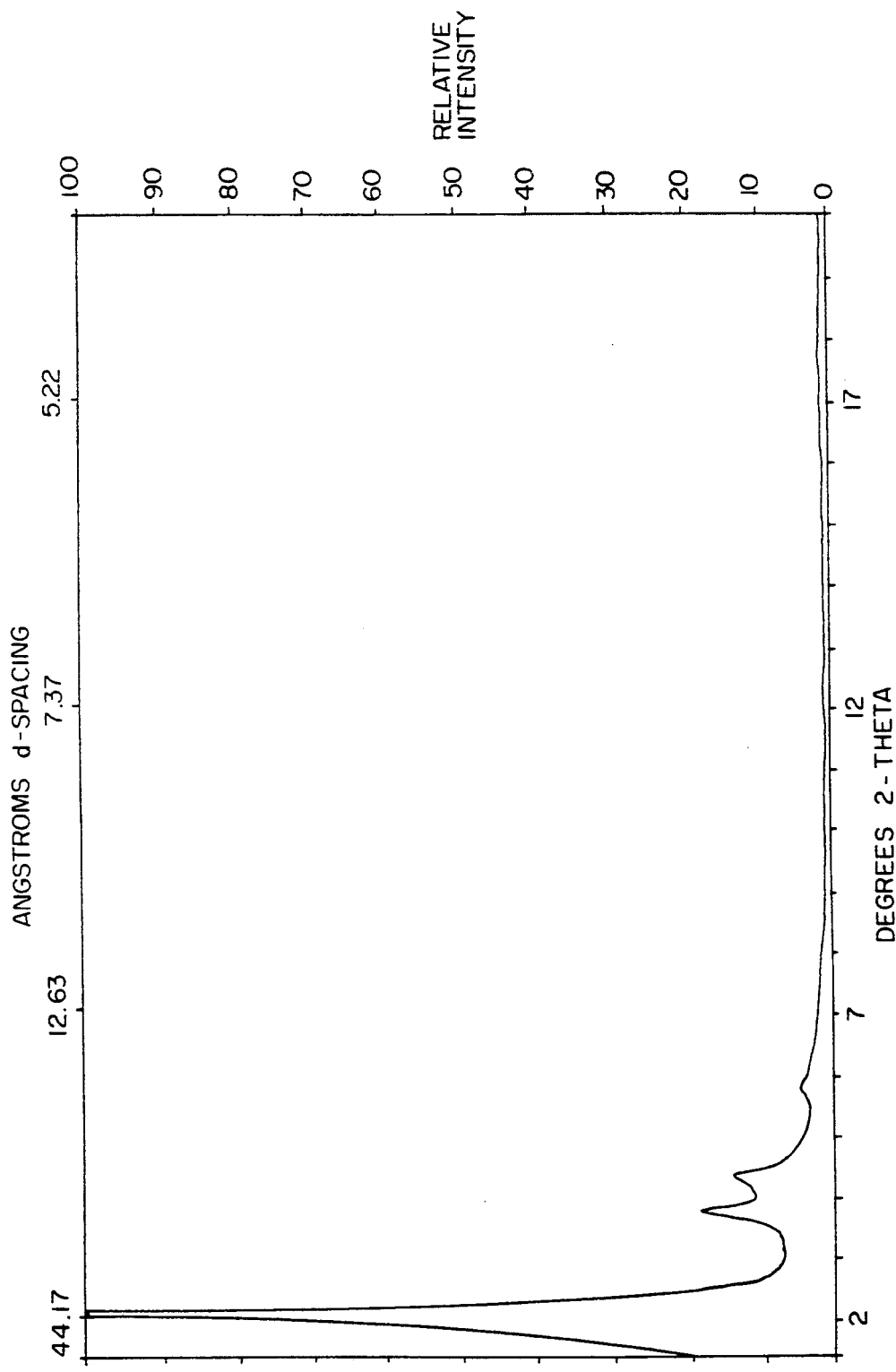

The X-ray diffraction pattern of the calcined product of this example is shown in FIG. 4. It may be characterized as including a very strong relative intensity line at 40.8±2.0 Angstroms d-spacing, and weak lines at 23.1±1.0 and 20.1±1.0 Angstroms. TEM indicated that the product contained the present ultra-large pore material (see Example 23).

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

1 0 moles $P_2O_5$
0.51 moles $(Pyr)_2O$
47.2 moles $H_2O$

The resulting solid product was recovered by filtration and dried in air at ambient temperature. The product was then calcined at 540° C. for 1 hour in nitrogen, followed by 6 hours in air.

The calcined product proved to have a surface area of 707 $m^2/g$ and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

Figure 5:
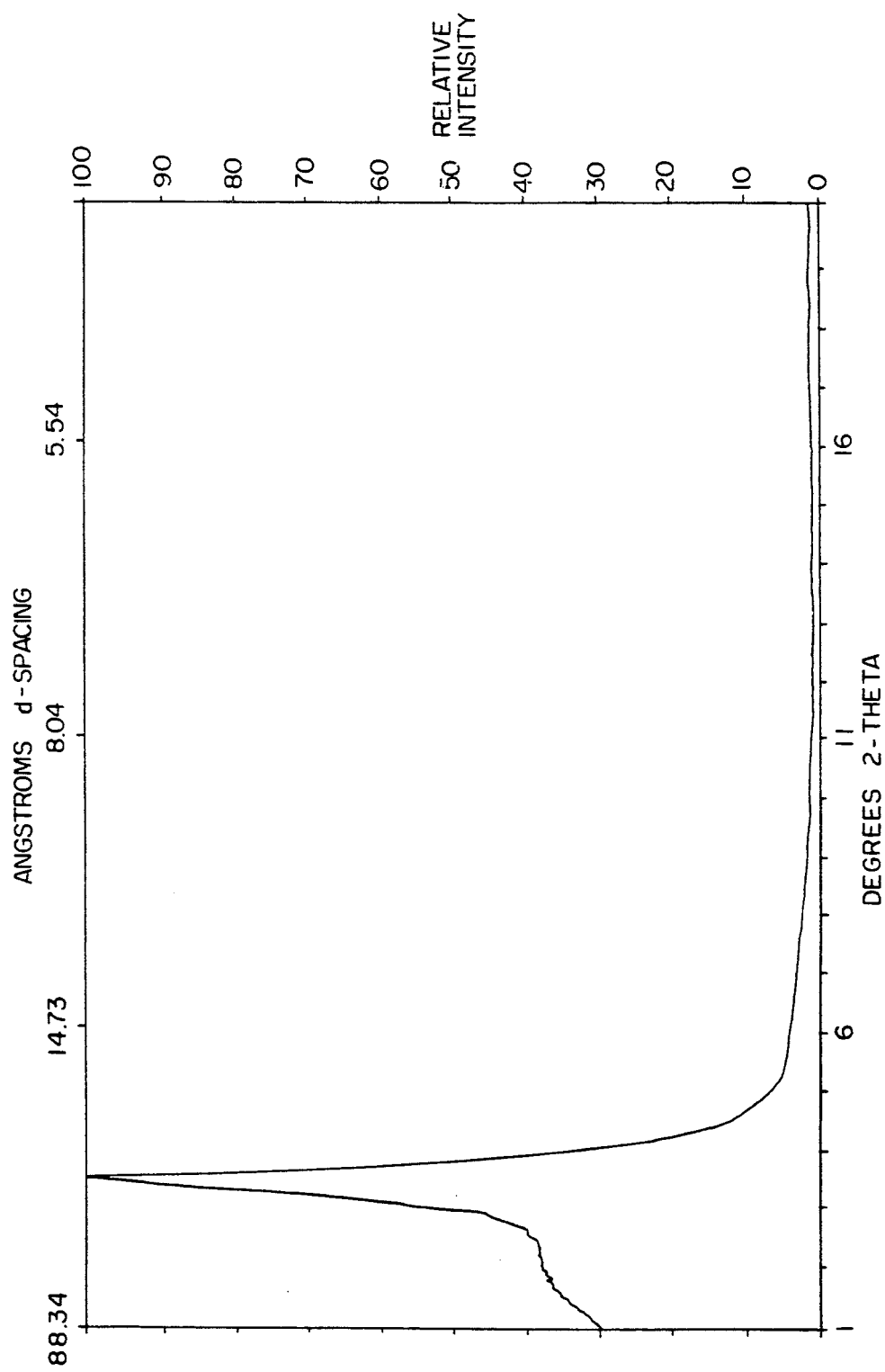

The X-ray diffraction pattern of the calcined product of this example is shown in FIG. 5. It may be characterized as including a very strong relative intensity line at 25.4±1.5 Angstroms d-spacing. TEM indicated the product contained the present ultra-large pore material (see Example 23).

EXAMPLE 6

A solution of 1.35 grams of $NaAlO_2$ (43.5% $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0 25 moles $Al_2O_3$
10 moles $Na_2O$
36 moles $SiO_2$
0.95 moles $(CTMA)_2O$
2.5 moles $(TEA)_2O$
445 moles $H_2O$ The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_2$, and proved to have a benzene equilibrium adsorption capacity of 58.6 grams/100 grams.

Figure 6:
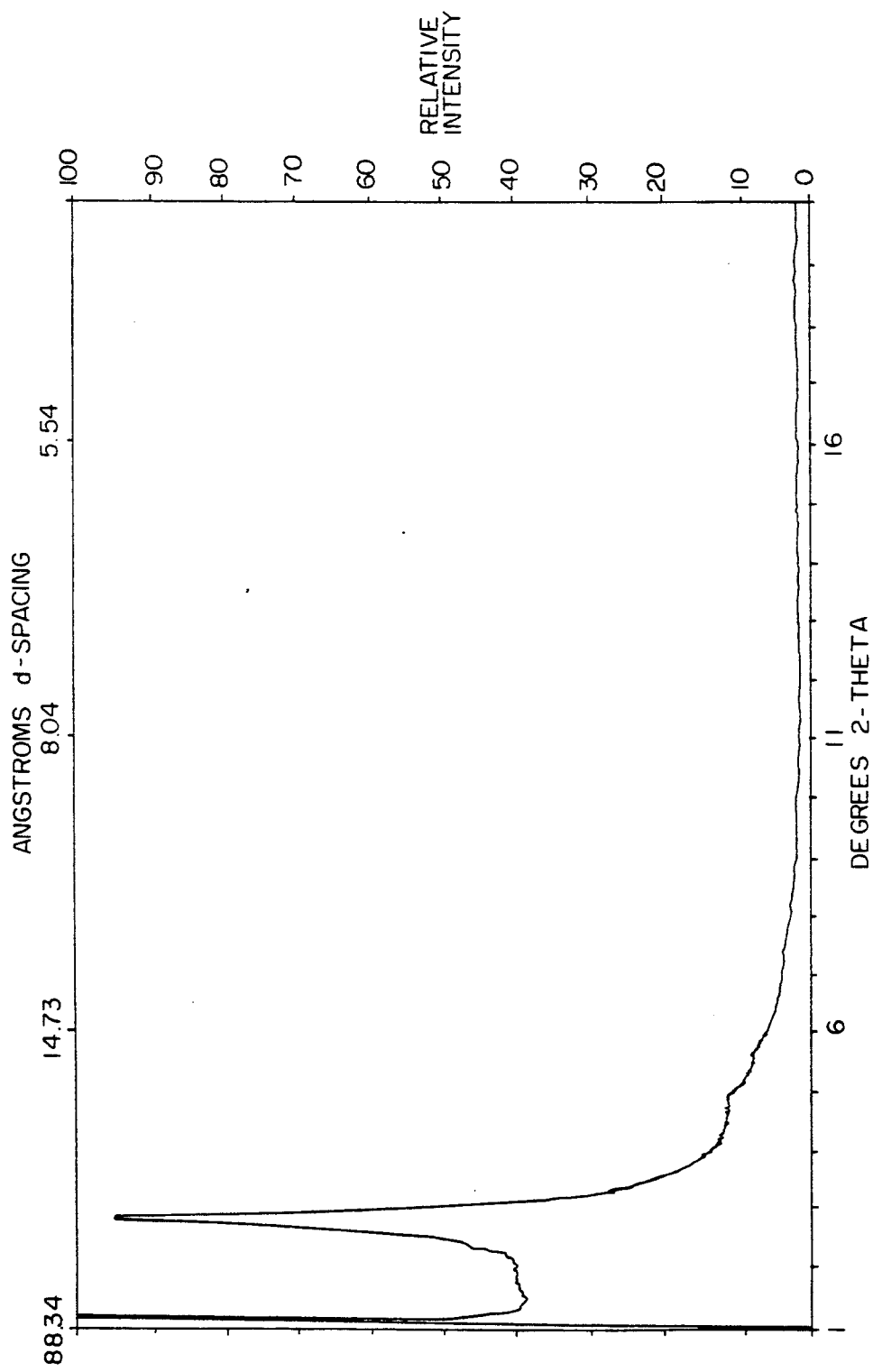

The X-ray diffraction pattern of the calcined product of this example is shown in FIG. 6. The product of this example may be characterized as including a very strong relative intensity line at 31.4±1.5 Angstroms d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole $SiO_2$:

0.5 mole $(CTMA)_2O$
46.5 moles $H_2O$

The resulting solid product was recovered by filtration, washed with water, then calcined at 540° C. for 1 hour in nitrogen, followed by 10 hours in air.

The calcined product composition included less than 0.01 wt. % Na, about 98.7 wt. % $SiO_2$ and about 0.01 wt. % $Al_2O_3$, and proved to have a surface area of 896 $m^2/g$. The calcined product had the following equilibrium adsorption capacities in grams/100 grams:

| | |
|---|---|
| H$_2$O | 8.4 |
| Cyclohexane | 49.8 |
| n-Hexane | 42.3 |
| Benzene | 55.7 |

Figure 7:
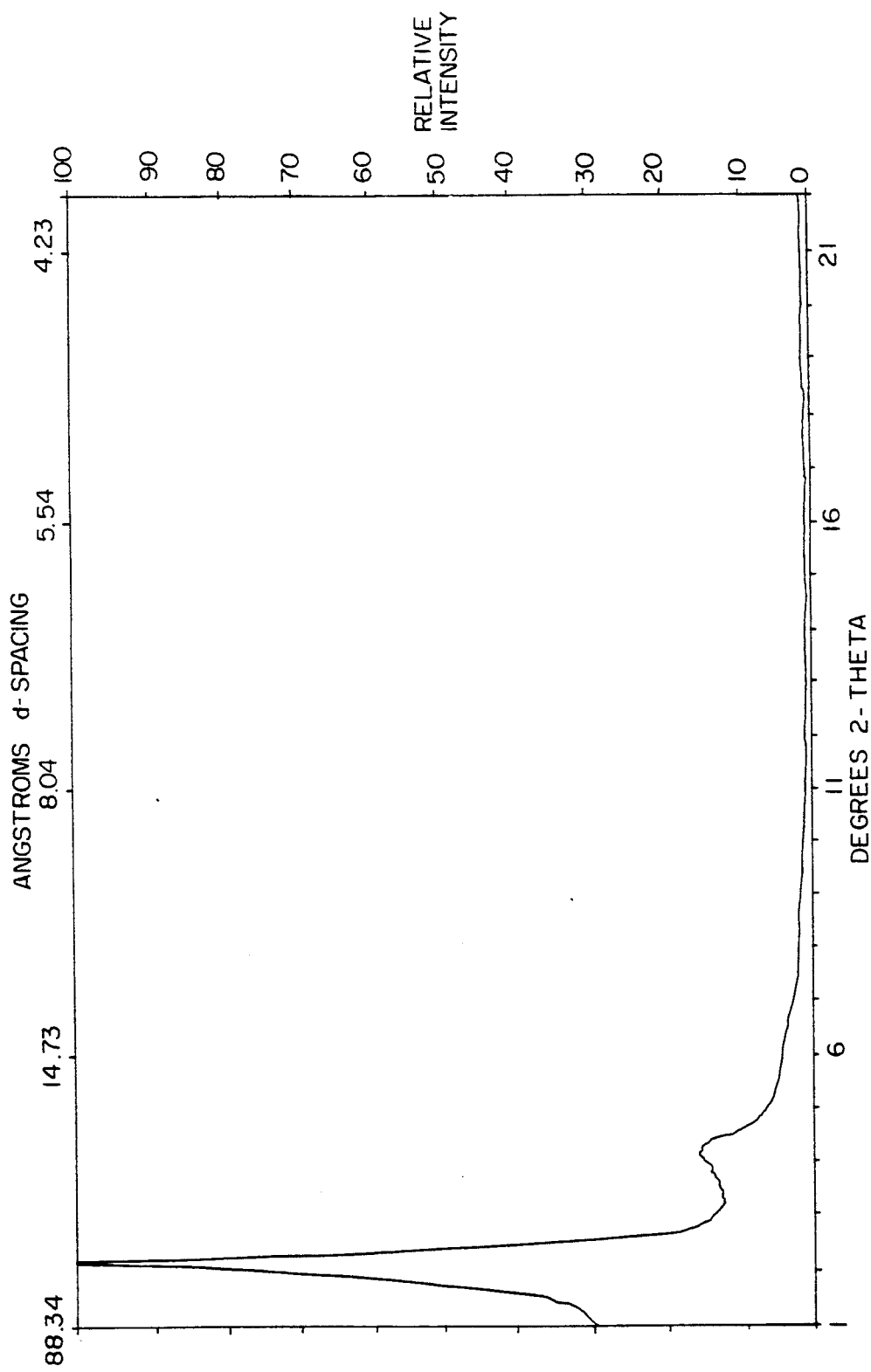

The X-ray diffraction pattern of the calcined product of this example is shown in FIG. 7. It may be characterized as including a very strong relative intensity line at 40.0±2.0 Angstroms d-spacing and a weak line at 21.2±1.0 Angstroms. TEM indicated that the product of this example contained at least three separate phases, one of which was the present ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole SiO$_2$:

0.5 mole (CTMA)$_2$O
46.5 moles H$_2$O

The resulting solid product was recovered by filtration, washed with water, then calcined at 540° C. for 6 hours in air.

The calcined product composition was measured to include 0.01 wt. % Na, 93.2 wt. % SiO$_2$ and 0.016 wt. % Al$_2$O$_3$, and proved to have a surface area of 992 m$^2$/g and the following equilibrium adsorption capacities in grams/100 grams:

| | |
|---|---|
| H$_2$O | 4.6 |
| Cyclohexane | >50 |
| n-Hexane | >50 |
| Benzene | 62.7 |

Figure 8:
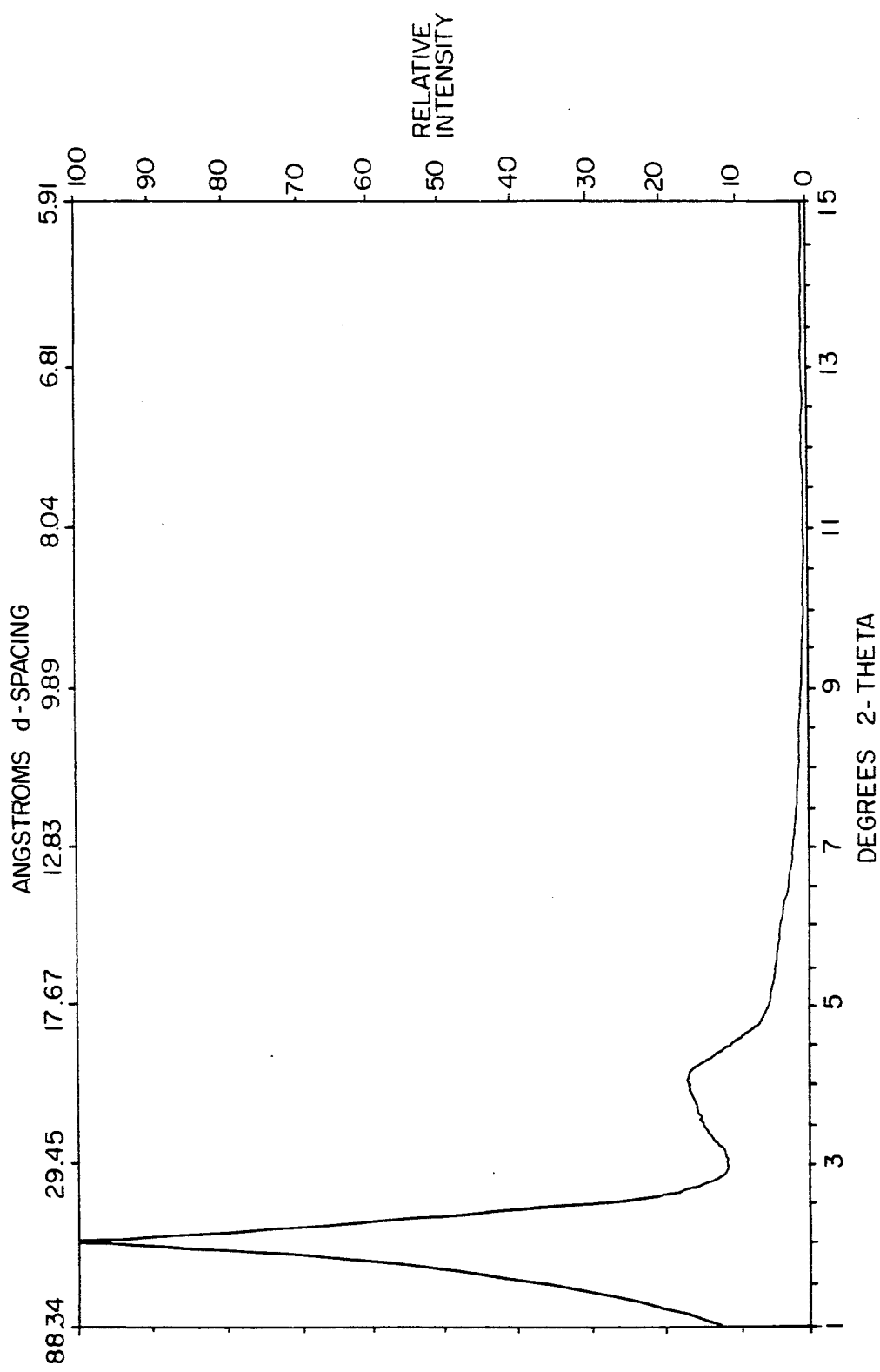

The X-ray diffraction pattern of the calcined product of this example is shown in FIG. 8. This product may be characterized as including a very strong relative intensity line at 43.6±2.0 Angstroms d-spacing and weak lines at 25.1±1.5 and 21.7±1.0 Angstroms. TEM indicated that the product contained the present ultra-large pore material.

EXAMPLE 9

Sodium aluminate (4.15 g) was added slowly into a solution containing 16 g of myristyltrimethylammonium bromide (C$_{14}$TMABr) in 100 g of water. Tetramethylammonium silicate (100 g—10% SiO$_2$), HiSil (25 g) and tetramethylammonium hydroxide (14.2 g—25% solution) were then added to the mixture. The mixture was crystallized in an autoclave at 120° C. with stirring for 24 hours.

Figure 9:
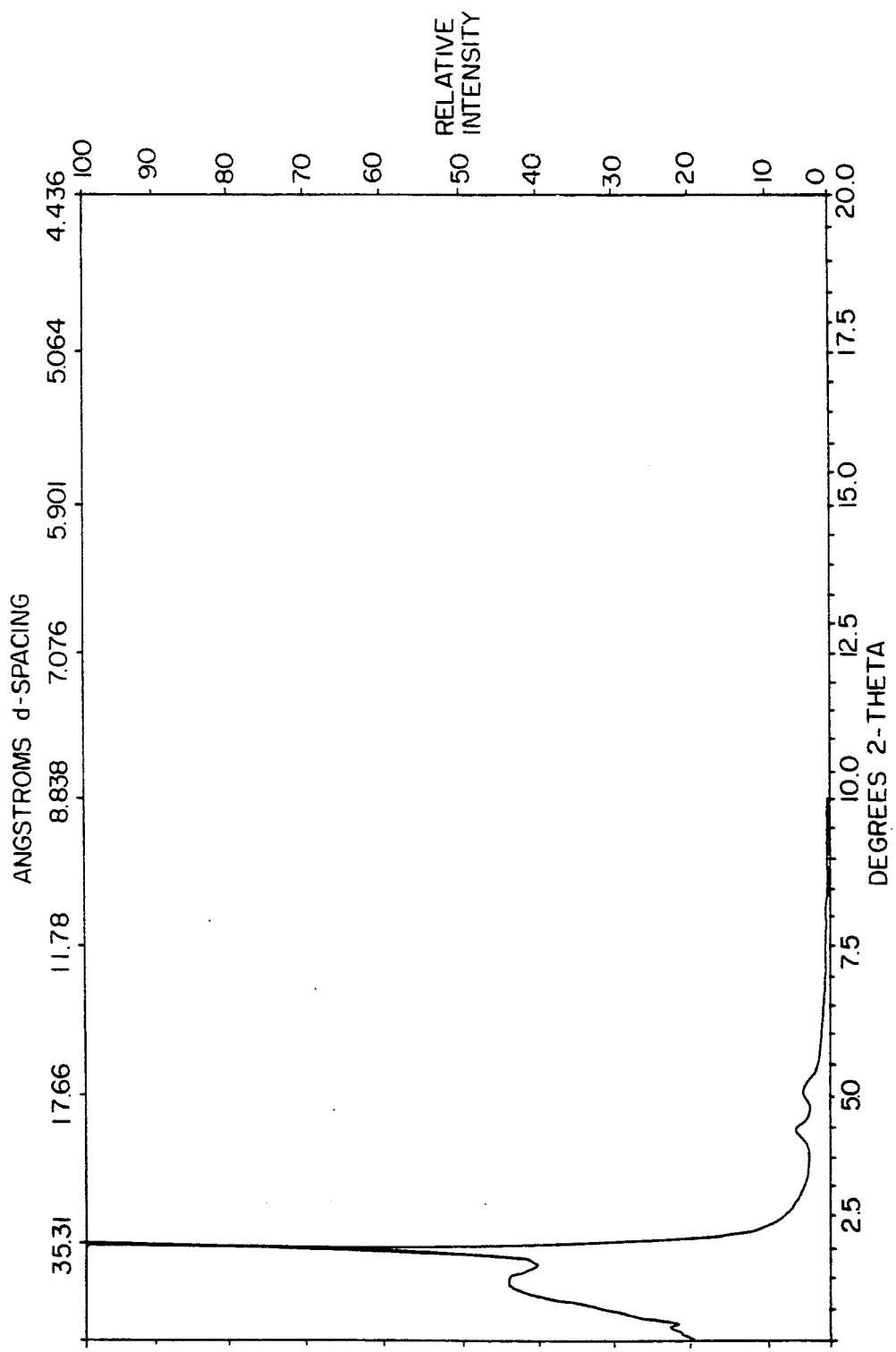

The product was filtered, washed and air dried. Elemental analysis showed the product contained 53.3 wt % SiO$_2$, 3.2 wt % Al$_2$O$_3$, 15.0 wt % C, 1.88 wt % N, 0.11 wt % Na and 53.5 wt % ash at 1000° C. FIG. 9 shows the X-ray diffraction pattern of the material having been calcined at 540° C. for 1 hour in N$_2$ and 6 hours in air. The X-ray diffraction pattern includes a very strong relative intensity line at 35.3±2.0 Angstroms d-spacing and weak lines at 20.4±1.0 and 17.7±1.0 Angstroms d-spacing. TEM indicated that the product contained the present ultra-large pore material.

The washed product, having been exchanged with 1N ammonium nitrate solution at room temperature, then calcined, proved to have a surface area of 827 m$^2$/g and the following equilibrium adsorption capacities in g/100 g anhydrous sorbent:

| | |
|---|---|
| H$_2$O | 30.8 |
| Cyclohexane | 33.0 |
| n-Hexane | 27.9 |
| Benzene | 40.7 |

EXAMPLE 10

Sodium aluminum (4.15 g) was added slowly into a solution containing 480 g of dodecyltrimethylammonium hydroxide (C$_{12}$TMAOH, 50%) solution diluted with 120 g of water. UltraSil (50 g) and an aqueous solution of tetramethylammonium silicate (200 g—10% SiO$_2$) and tetramethylammonium hydroxide (26.38 g—25% solution) were then added to the mixture. The mixture was crystallized in an autoclave at 100° C. with stirring for 24 hours.

Figure 10:
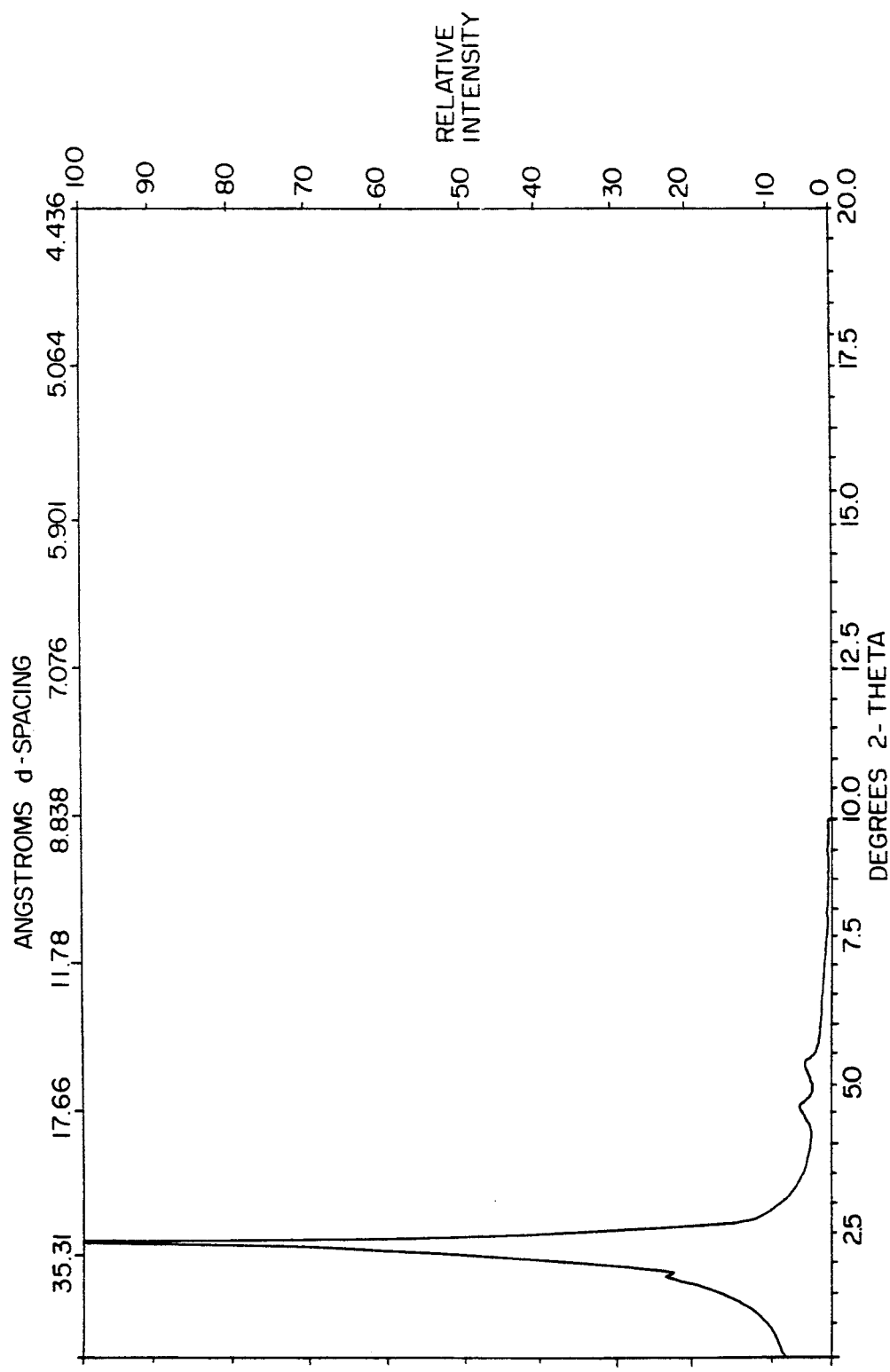

The product was filtered, washed and air dried. FIG. 10 shows the X-ray diffraction pattern of the material having been calcined at 540° C. for 1 hour in N$_2$ and 6 hours in air. The X-ray diffraction pattern includes a very strong relative intensity line at 30.4±1.5 Angstroms d-spacing and weak lines at 17.7±1.0 and 15.3±1.0 Angstroms d-spacing. TEM indicated that the product contained the present ultra-large pore material.

The washed product, having been exchanged with 1N ammonium nitrate solution at room temperature, then calcined, proved to have a surface area of 1078 m$^2$/g and the following equilibrium adsorption capacities in g/100 g anhydrous sorbent:

| | |
|---|---|
| H$_2$O | 32.6 |
| Cyclohexane | 38.1 |
| n-Hexane | 33.3 |
| Benzene | 42.9 |

EXAMPLE 11

A solution of 4.9 grams of NaAlO$_2$ (43.5% Al$_2$O$_3$, 30% NaO$_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole Al$_2$O$_3$:

1.1 moles Na$_2$O
30.6 moles SiO$_2$
3.0 moles (TEA)$_2$O
3.25 moles (CTMA)$_2$O
609 moles H$_2$O The resulting solid product was recovered by filtration, washed with water then calcined at 540° C. for 16 hours in air.

The calcined product proved to have a surface area of 1352 m$^2$/g and the following equilibrium adsorption capacities in grams/100 grams:

| | |
|---|---|
| H$_2$O | 23.6 |
| Cyclohexane | >50 |
| n-Hexane | 49 |

| | |
|---|---|
| Benzene | 67.5 |

Figure 11:
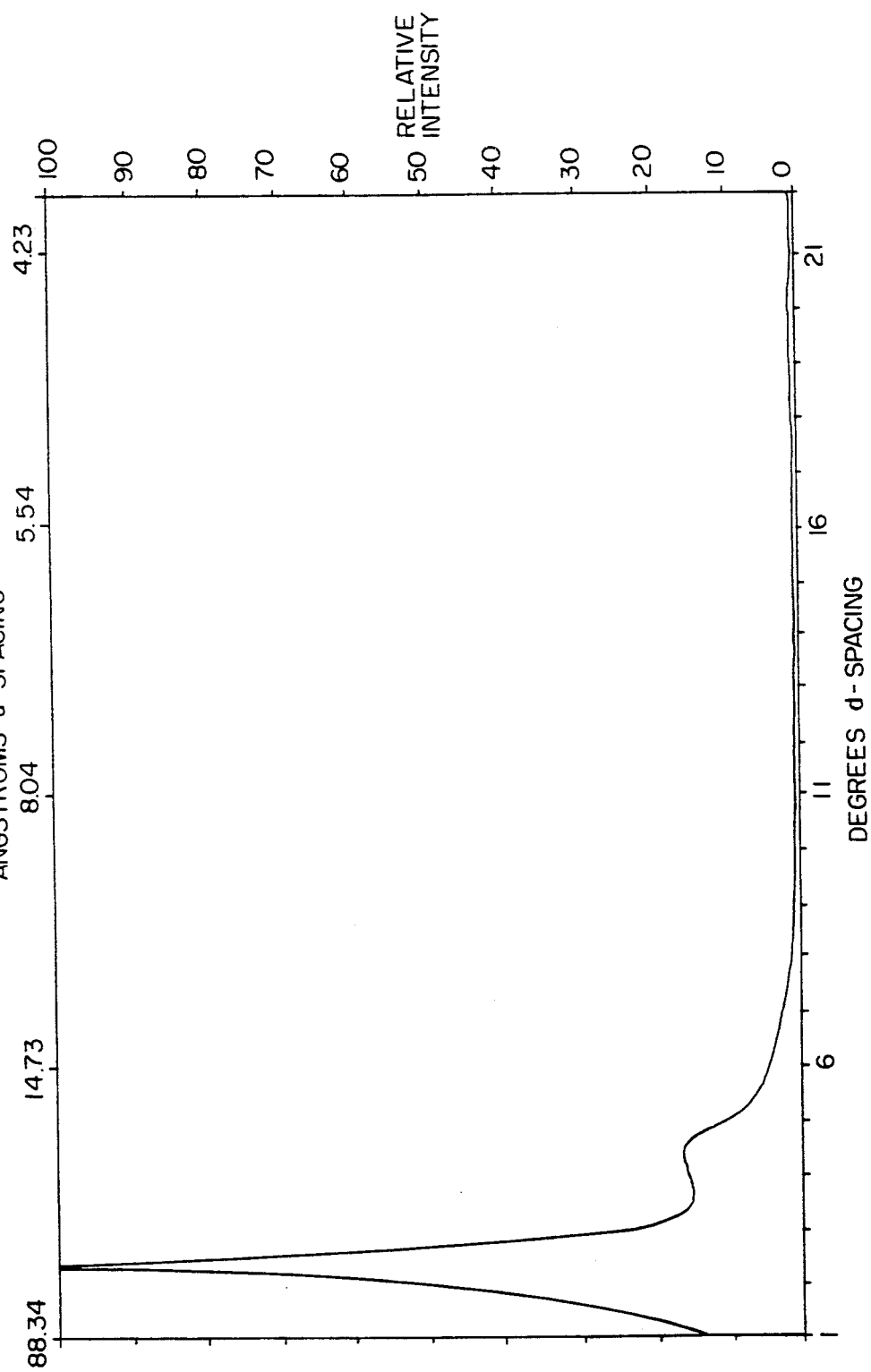

The X-ray diffraction pattern of the calcined product of this example is shown in FIG. 11. The product of this example may be characterized as including a very strong relative intensity line at 38.5±2.0 Angstroms d-spacing and a weak line at 20.3±1.0 Angstroms. TEM indicated that the product contained the present ultra-large pore material.

EXAMPLE 12

Figure 12:
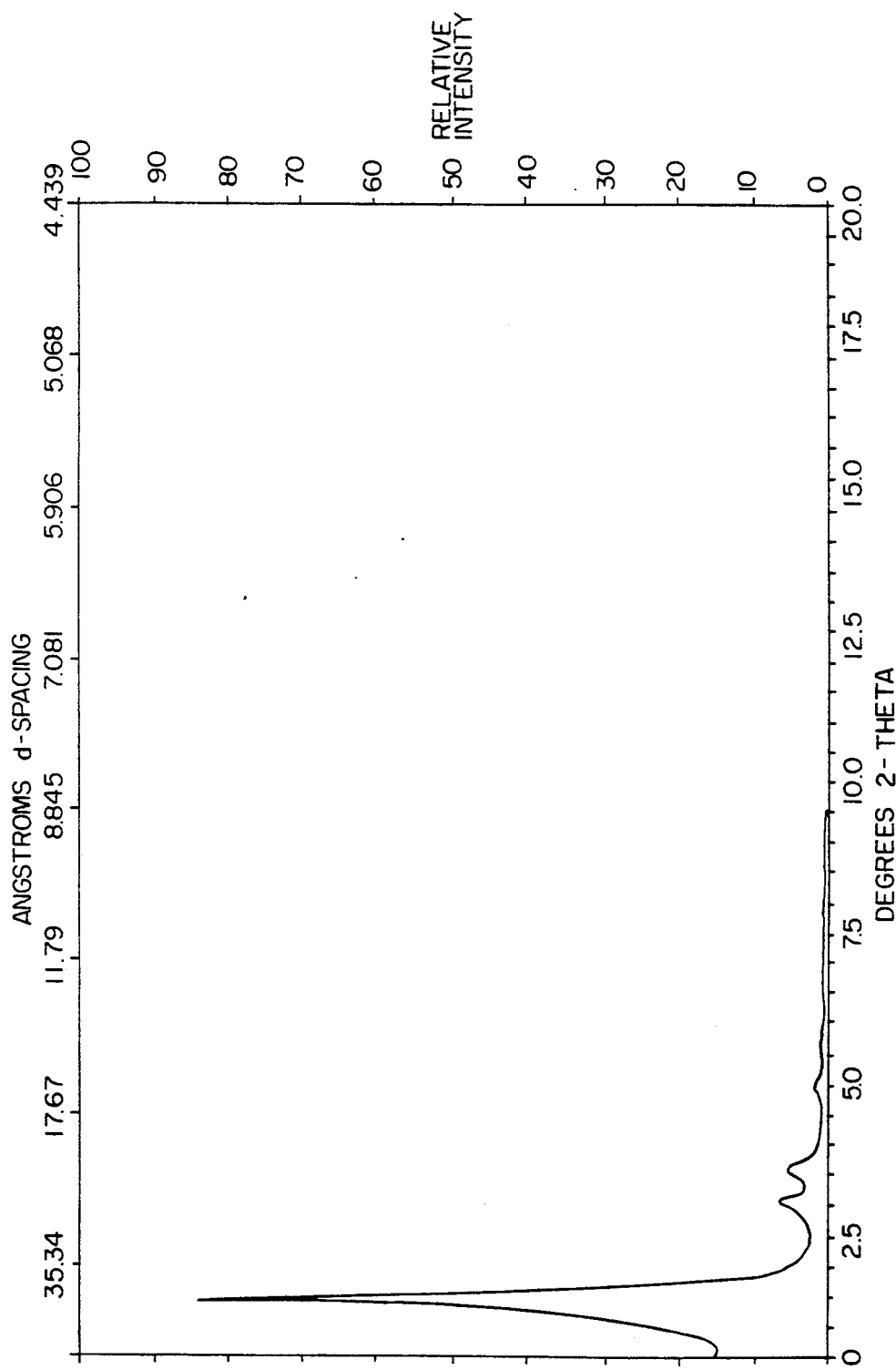

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. TEM indicated that this product contained the present ultra-large pore material. The X-ray diffraction pattern of the calcined product of this example is shown in FIG. 12. This pattern can be characterized as including a very strong relative intensity line at 44.2±2.0 Angstroms d-spacing and weak lines at 25.2±1.5 and 22.0±1.0 Angstroms.

The calcined product proved to have a surface area of 932 m²/g and the following equilibrium adsorption capacities in grams/100 grams:

| | |
|---|---|
| $H_2O$ | 39.3 |
| Cyclohexane | 46.6 |
| n-Hexane | 37.5 |
| Benzene | 50 |

The product of this example was then ammonium exchanged with 1N $NH_4NO_3$ solution, followed by calcination at 540° C. for 10 hours in air.

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
27.8 moles $SiO_2$
5.1 moles $(CTMA)_2O$
4.4 moles $(TMA)_2O$
650 moles $H_2O$ The resulting solid product was recovered by filtration and dried in air at ambient temperature. The product was then calcined at 540° C. for 1 hour in nitrogen, followed by 6 hours in air.

The calcined product proved to have the following equilibrium adsorption capacities in grams/100 grams:

| | |
|---|---|
| $H_2O$ | 35.2 |
| Cyclohexane | >50 |
| n-Hexane | 40.8 |
| Benzene | 53.5 |

Figure 13:
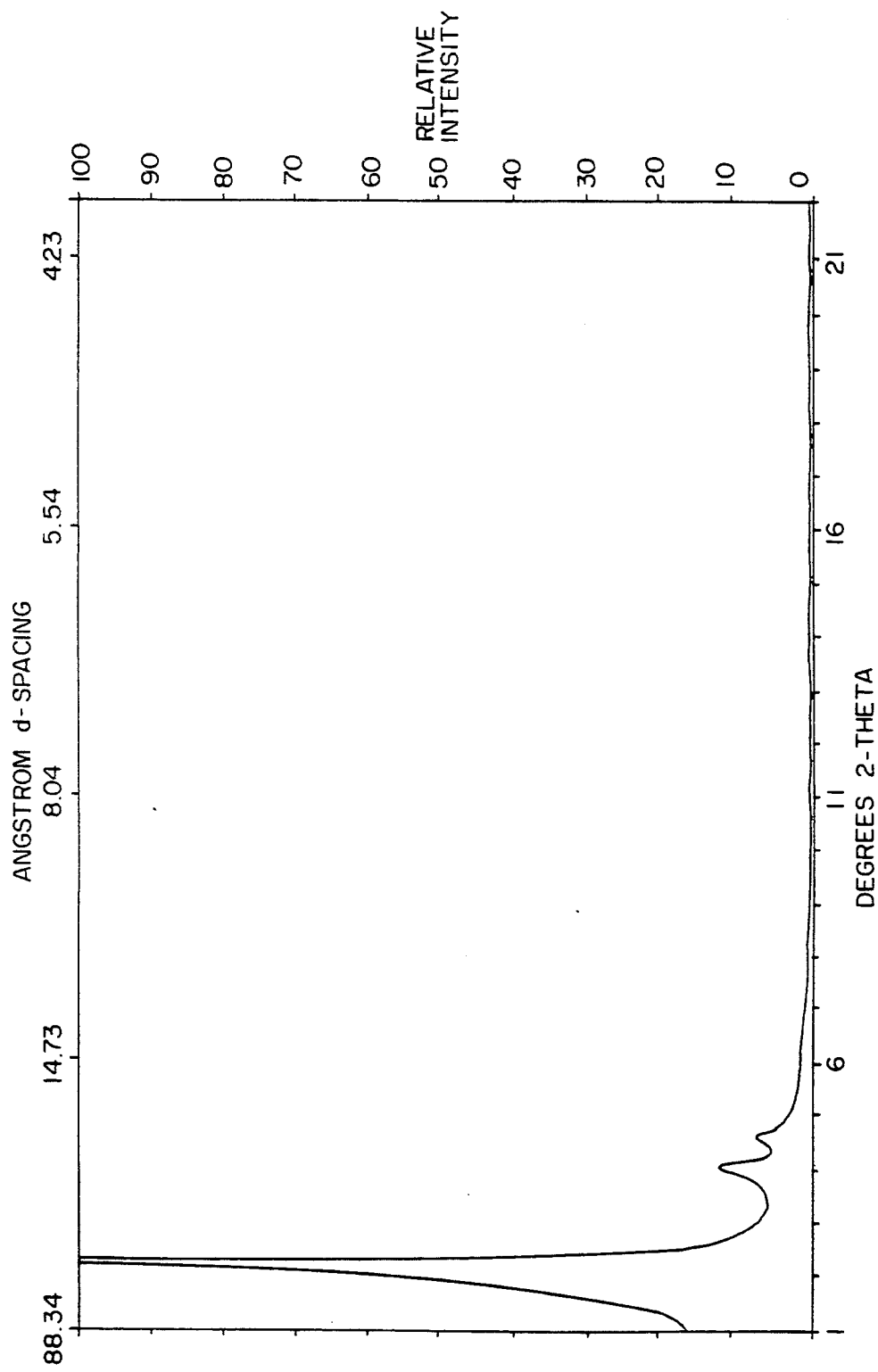

The X-ray diffraction pattern of the calcined product of this example is shown in FIG. 13. This product may be characterized as including a very strong relative intensity line at 39.1±2.0 Angstroms d-spacing and weak lines at 22.4±1.0 and 19.4±1.0 Angstroms. TEM indicated that this product contained the present ultra-large pore material.

The product of this example was then ammonium exchanged with 1N $NH_4NO_3$ solution, followed by calcination at 540° C. for 10 hours in air.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 grams $H_2O$) was stirred thoroughly and crystallized at 150° C. for 168 hours. The reaction mixture had the following relative molar composition in terms of moles per mole silica:

0.10 moles $(CTMA)_2O$
21.89 moles $H_2O$
0.036 moles $NaAlO_2$
0.53 moles $NaOH$ The solid product was isolated by filtration, washed with water, dried for 16 hours at room temperature and calcined at 540° C. for 10 hours in air.

The calcined product proved to have a surface area of 840 m²/g, and the following equilibrium adsorption capacities in grams/100 grams:

| | |
|---|---|
| $H_2O$ | 15.2 |
| Cyclohexane | 42.0 |
| n-Hexane | 26.5 |
| Benzene | 62 |

Figure 14:
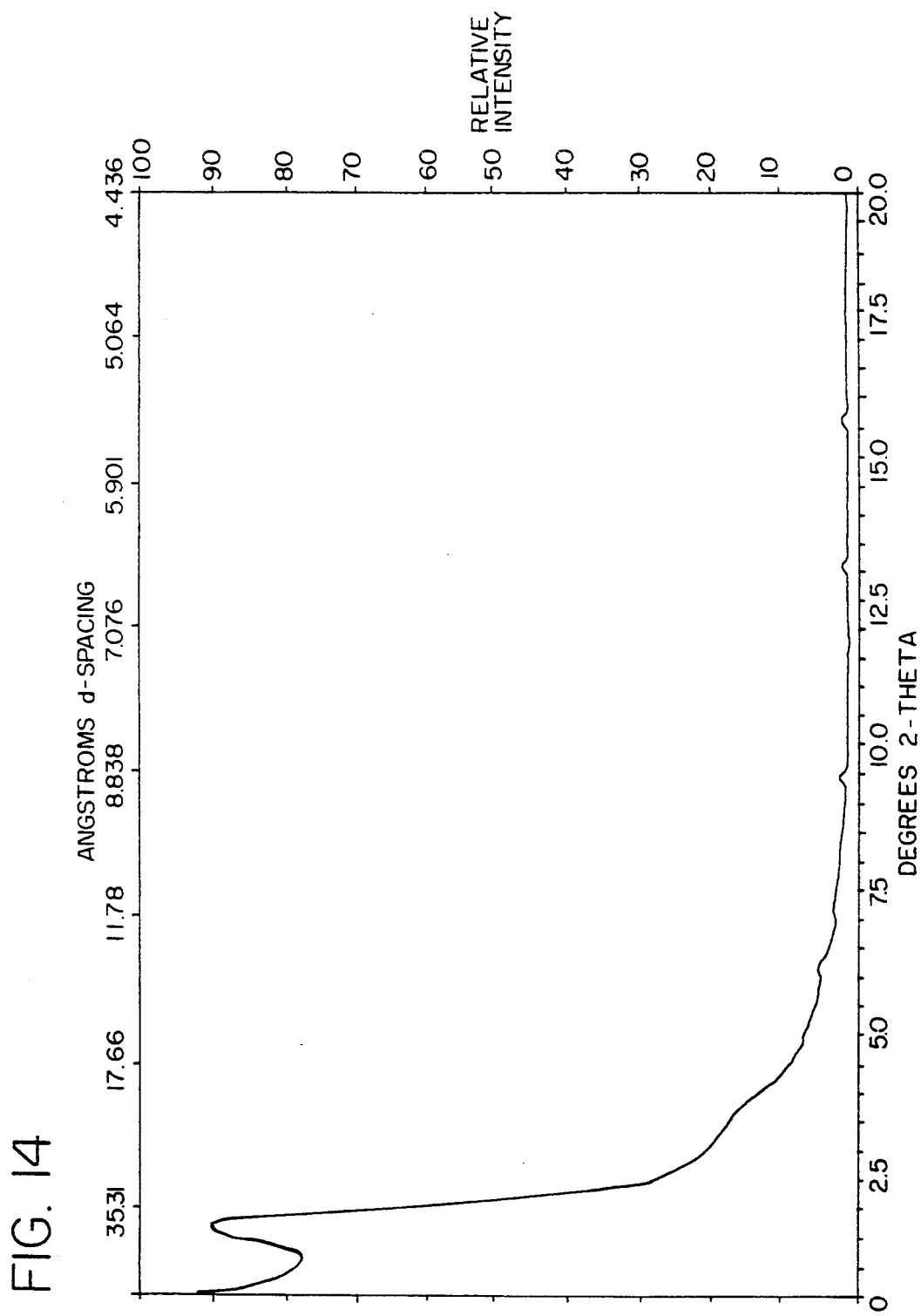

The X-ray diffraction pattern of the calcined product of this Example, shown in FIG. 14, may be characterized as including a very strong relative intensity line at 40.5±2.0 Angstroms d-spacing. TEM indicated that the product contained the present ultra-large pore material.

EXAMPLE 15

For comparison purposes, a commercially prepared ultra-stable zeolite Y was obtained. It had a benzene equilibrium adsorption capacity of 20.7 grams/100 grams. Its X-ray diffraction pattern had all the lines of zeolite Y with its highest value peak at about 14.0 Angstroms d-spacing.

EXAMPLE 16

To make the primary template mixture for this example, 240 grams of water was added to a 92 gram solution of 50% dodecyltrimethylammonium hydroxide, 36% isopropyl alcohol and 14% water such that the mole ratio of Solvent/$R_{2/f}O$ was 155. The mole ratio of $H_2O/R_{2/f}O$ in this mixture was 149 and the IPA/$R_{2/f}O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution. The mole ratio of $R_{2/f}O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

0.05 mole $Na_2O$
0.036 mole $Al_2O_3$
0.18 mole $(C_{12}TMA)_2O$
0.12 mole $(TMA)_2O$
36.0 moles $H_2O$
1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1223 $m^2$/g and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

Figure 15:
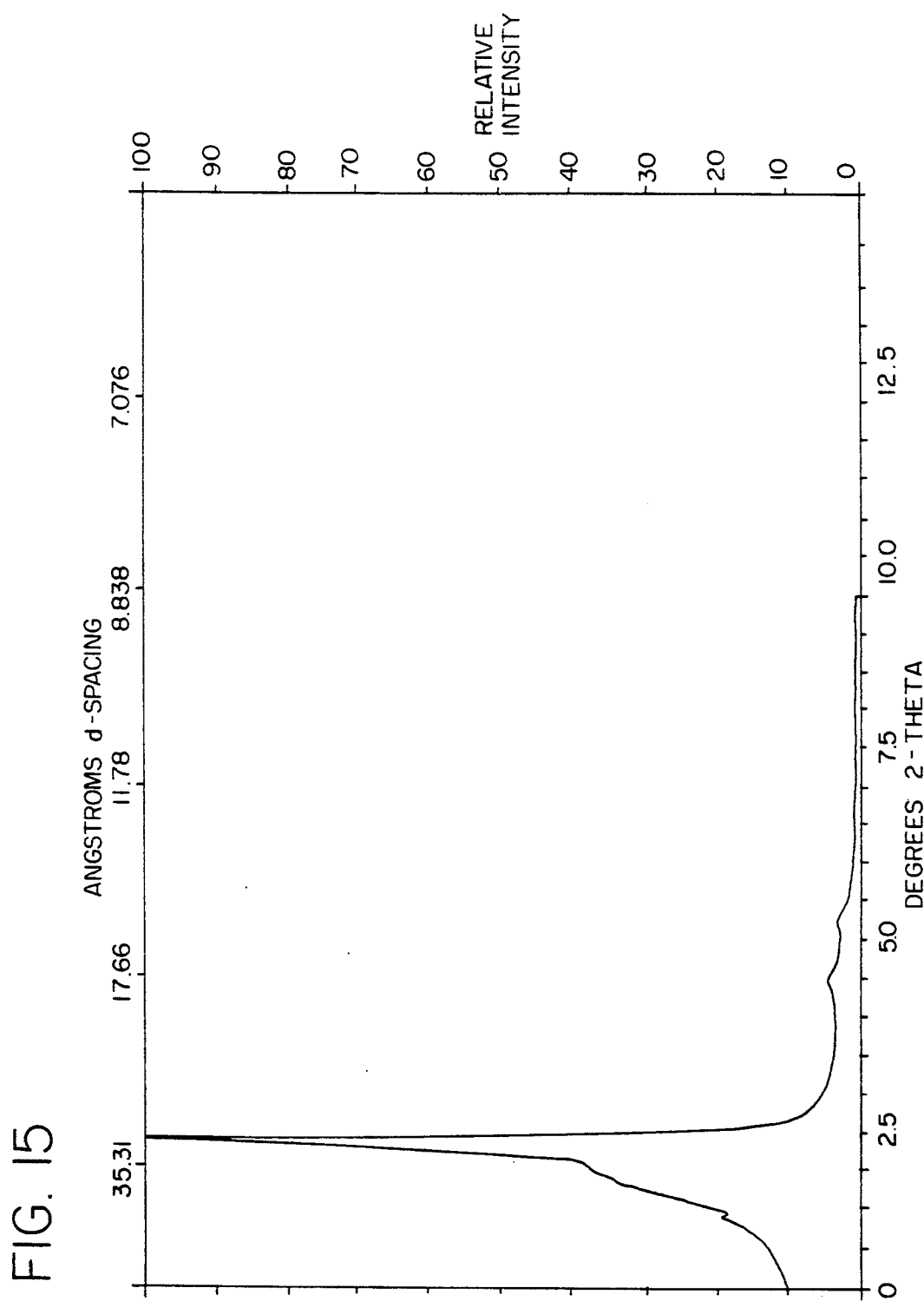

The X-ray diffraction pattern of the calcined product of this example is shown in FIG. 15. This product may be characterized as including a very strong relative intensity line at 30.8±1.5 Angstroms d-spacing and weak lines at 17.9±1.0 and 15.5±1.0 Angstroms. TEM indicated this product to contain the present ultra-large pore material.

EXAMPLE 17

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

0.8 mole $(C_{10}TMA)_2O$
47.6 moles $H_2O$

The resulting solid product was filtered and washed several times with warm (60°-70° C.) distilled water and with acetone. The final product was calcined to 538° C. in $N_2$/air mixture and then held in air for about 8 hours.

The calcined product proved to have a surface area of 915 $m^2$/g and an equilibrium benzene adsorption capacity of 35 grams/100 grams. Argon physisorption data indicated an argon uptake of 0.34 cc/gram, and a pore size of 15 Angstroms.

The X-ray diffraction pattern of the calcined product of this example may be characterized as including a very strong relative intensity line at 27.5±1.5 Angstroms d-spacing and weak lines at 15.8±1.0 and 13.7±1.0 Angstroms. TEM indicated that the product of this example contained the present ultra-large pore material.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
80.53 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours.

The calcined product proved to have an equilibrium benzene adsorption capacity of >25 grams/100 grams.

The X-ray diffraction pattern of the calcined product of this example may be characterized as including a broad, very strong relative intensity line at about 102 Angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Angstroms d-spacing and about 120 Angstroms d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

- 1.25 moles $Na_2O$
- 27.8 moles $SiO_2$
- 5.1 moles $(CTMA)_2O$
- 2.24 moles $(TMA)_2O$
- 2256 moles $H_2O$
- 132.7 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours.

The calcined product proved to have a surface area of 915 $m^2$/g and an equilibrium benzene adsorption capacity of >25 grams/100 grams. Argon physisorption data indicated an argon uptake of 0.95 cc/gram, and a pore size centered on 78 Angstroms (Dollimore-Heal Method, see Example 22(b)), but running from 70 to greater than 105 Angstoms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different $d_{100}$ values as observed in their electron diffraction patterns. These materials were found to possess $d_{100}$ values between about 85 Angstroms d-spacing and about 110 Angstroms d-spacing.

EXAMPLE 20

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

- 1.25 moles $Na_2O$
- 27.8 moles $SiO_2$
- 5.1 moles $(CTMA)_2O$
- 2.24 moles $(TMA)_2O$
- 650 moles $H_2O$
- 19.9 moles 1,3,5-trimethylbenzene The resulting product was filtered and washed several times with warm (60°-70° C.) distilled water and with acetone. The final product was calcined to 538° C. in $N_2$/air mixture and then held in air for about 8 hours.

The calcined product proved to have a surface area of 975 $m^2$/g and an equilibrium benzene adsorption capacity of >40 grams/100 grams. Argon physisorption data indicated an argon uptake of 0.97 cc/gram, and a pore size of 63 Angstroms (Dollimore-Heal Method, see Example 22(b)), with the peak occurring at $P/P_o=0.65$.

The X-ray diffraction pattern of the calcined product of this example may be characterized as including a very strong relative intensity line at 63±5 Angstroms d-spacing and weak lines at 36.4±2.0, 31.3±1.5 Angstroms and 23.8±1.0 Angstroms d-spacing. TEM indicated that the product of this example contained the present ultra-large pore material.

EXAMPLE 21

For catalytic evaluation of the molecular sieve for which the synthesis technique of the present invention is particularly preferred, final products from Examples 1 through 15 were evaluated for dealkylation of tri-tert-butylbenzene (TBB) to di-tert butylbenzene. The present evaluation was conducted under one or both of two sets of conditions: (i) at a temperature of 225° C., weight hourly space velocity of 100 $hr^{-1}$ or (ii) at a temperature of 200° C., weight hourly space velocity of 200 $hr^{-1}$. Pressure was atmospheric. The feed was composed of 6.3/93.7 TTBB/toluene. Conversion was measured at 30 minutes on stream.

The results were as follows:

| Catalyst of Example | Conversion. wt. % | |
|---|---|---|
| | 225° C./100 $hr^{-1}$ | 200° C./200 $hr^{-1}$ |
| 1 | 0 | — |
| 2 | 6.2 | — |
| 3 | 53.9 | — |
| 4 | 10.4 | — |
| 5 | 68.9 | — |
| 6 | 100.0 | — |
| 7 | 93.4 | 66.0 |
| 8 | 5.3 | — |
| 9 | — | 61.2 |
| 10 | — | 58.9 |
| 11 | 86.3 | — |
| 12 | 96.7 | — |
| 13 | 92.8 | — |
| 14 | — | 37.7 |
| 15 | 12.0 | 0 |

EXAMPLE 22(a)

Argon Physisorption For Pore Systems Up to About 60 Angstroms Diameter

To determine the pore diameters of the preferred products of this invention with pores up to about 60 Angstroms in diameter, 0.2 gram samples of the products of Examples 1 through 17 were placed in glass sample tubes and attached to a physisorption apparatus as described in U.S. Pat. No. 4,762,010, which is incorporated herein by reference.

Figure 16:
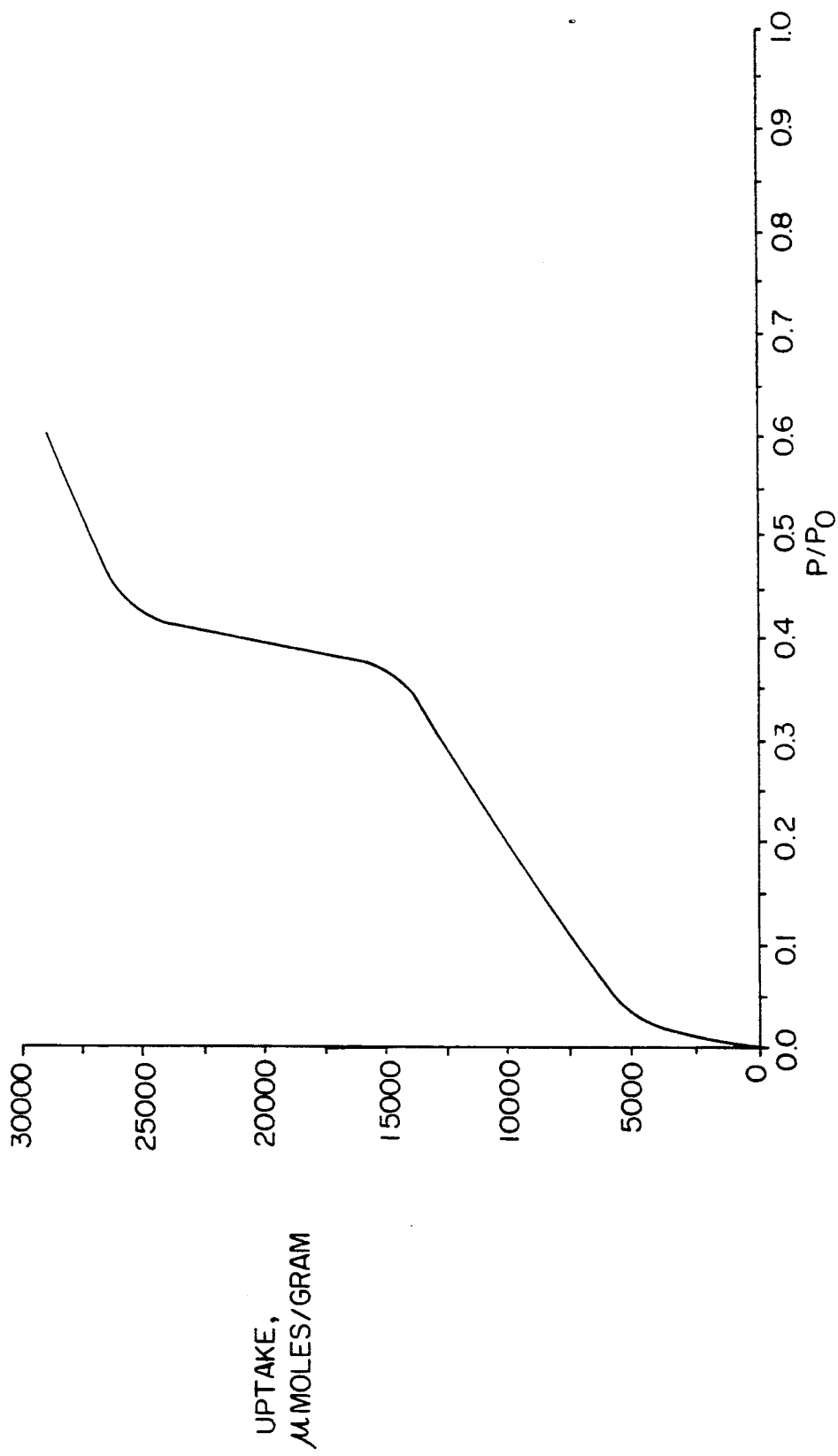
FIG. 16 is an isotherm plot of physisorption measurements from Example 22.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption. Surface Area and Porosity*, 2nd ed., Academic Press, 1982). In each instance, a graph of the amount adsorbed versus the relative pressure above the sample, at equilibrium, constitutes the adsorption isotherm as shown in FIG. 16 for the Example 4 product sample. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

Figure 17:
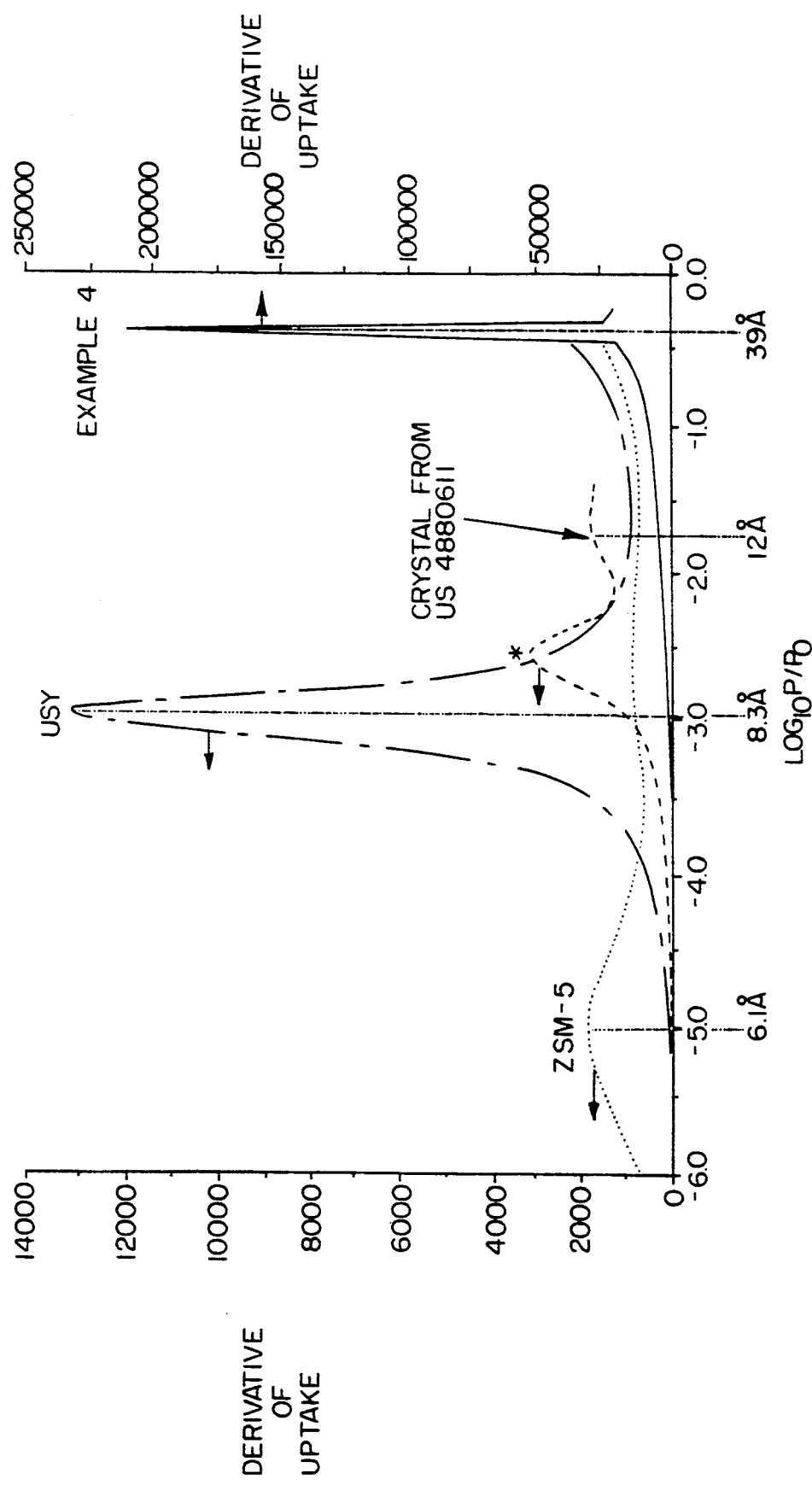
FIG. 17 is a plot of physisorption measurements from Example 22 showing pore sizes of various crystalline materials.

The step (inflection) in the isotherm, in this case (Example 4 product) at about $P/P_o=0.4$, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. This is shown in FIG. 17. Also shown in FIG. 17 are data obtained in an identical fashion for a crystalline material from U.S. Pat. No. 4,880,611 and several other crystal materials. There is further provided a physical scale on the axis which converts the position of an adsorption peak in terms of log $(P/P_o)$ to the physical pore diameter in Angstroms. This conversion was obtained by using the following formula:

$$\log(P/P_o) = \frac{K}{d - 0.38} \left( \frac{S^4}{3(L - D/2)^3} - \frac{S^{10}}{9(L - D/2)^9} - \frac{S^4}{3(D/2)^3} + \frac{S^{10}}{9(D/2)^9} \right)$$

wherein d=pore diameter in nanometers, $K=32.17$, $S=0.2446$, $L=d+0.19$, and $D=0.57$.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Angstroms in diameter.

As is indicated in FIG. 17, the pore size of the material of Example 4 is 39.6 Angstroms with the peak occurring at log $(P/P_o) = -0.4$ or $P/P_o=0.4$, while the pore size of the material from U.S. Pat. No. 4,880,611 is 12 Angstroms or $P/P_o=0.02$. In the other materials, a peak is observed at $P/P_o=0.015$ which is denoted by an asterisk in FIG. 17. This peak reflects adsorption on the walls of the pores and is not otherwise indicative of the size of the pores of a given material. A value of $P/P_o$ of 0.03 corresponds to 13 Angstroms pore size.

The results of this procedure for the samples from Examples 1 through 17 are tabulated below. The samples from Examples 10, 13 and 16 gave two separate peaks, believed to be the result of two separate ultra-large pore phases in the products.

| Examples | Pore Diameter, Angstroms |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 8.3 |

-continued

| Examples | Pore Diameter, Angstroms |
|---|---|
| 16 | 22.4, 30.4 |
| 17 | 15.0 |

EXAMPLE 22(b)

Argon Physisorption For Pore Systems Over About 60 Angstroms Diameter

The above method of Horvath and Kawazoe for determining pore size from physisorption isotherms was intended to be applied to pore systems of up to 20 Angstroms diameter; but with some care as above detailed, its use can be extended to pores of up to 60 Angstroms diameter.

In the pore regime above 60 Angstroms diameter, however, the Kelvin equation can be applied. It is usually given as:

$$\ln(P/P_o) = \frac{-2\gamma V}{r_k RT} \cos\theta$$

where:
$\gamma$ = surface tension of sorbate
V = molar volume of sorbate
$\theta$ = contact angle (usually taken for practical reasons to be 0)
R = gas constant
T = absolute temperature
$r_k$ = capillary condensate (pore) radius
$P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem*, 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

The products of Examples 19 and 20 were subjected to the Dollimore and Heal Method for argon physisorption data, as indicated.

EXAMPLE 23

Transmission Electron Microscopy

To further illustrate the nature of the crystalline product for which the synthesis technique of the present invention is particularly preferred, samples of the products from Examples 1 through 14 and 16 through 20 were studied by transmission electron microscopy (TEM) as noted above. TEM is a technique used to reveal the microscopic structure of materials, including crystalline materials.

In order to illuminate the microstructure of materials, samples must be thin enough for an electron beam to pass through them, generally about 500–1000 Angstrom units or so thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L. R. WHITE (hard), which is then cured at about 80° C. for about 1½ hours. Thin sections of the block are cut on an ultramicrotome using a diamond knife and sections in the thickness range 500–1000 Angstrom units are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDP's are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

Figure 18:
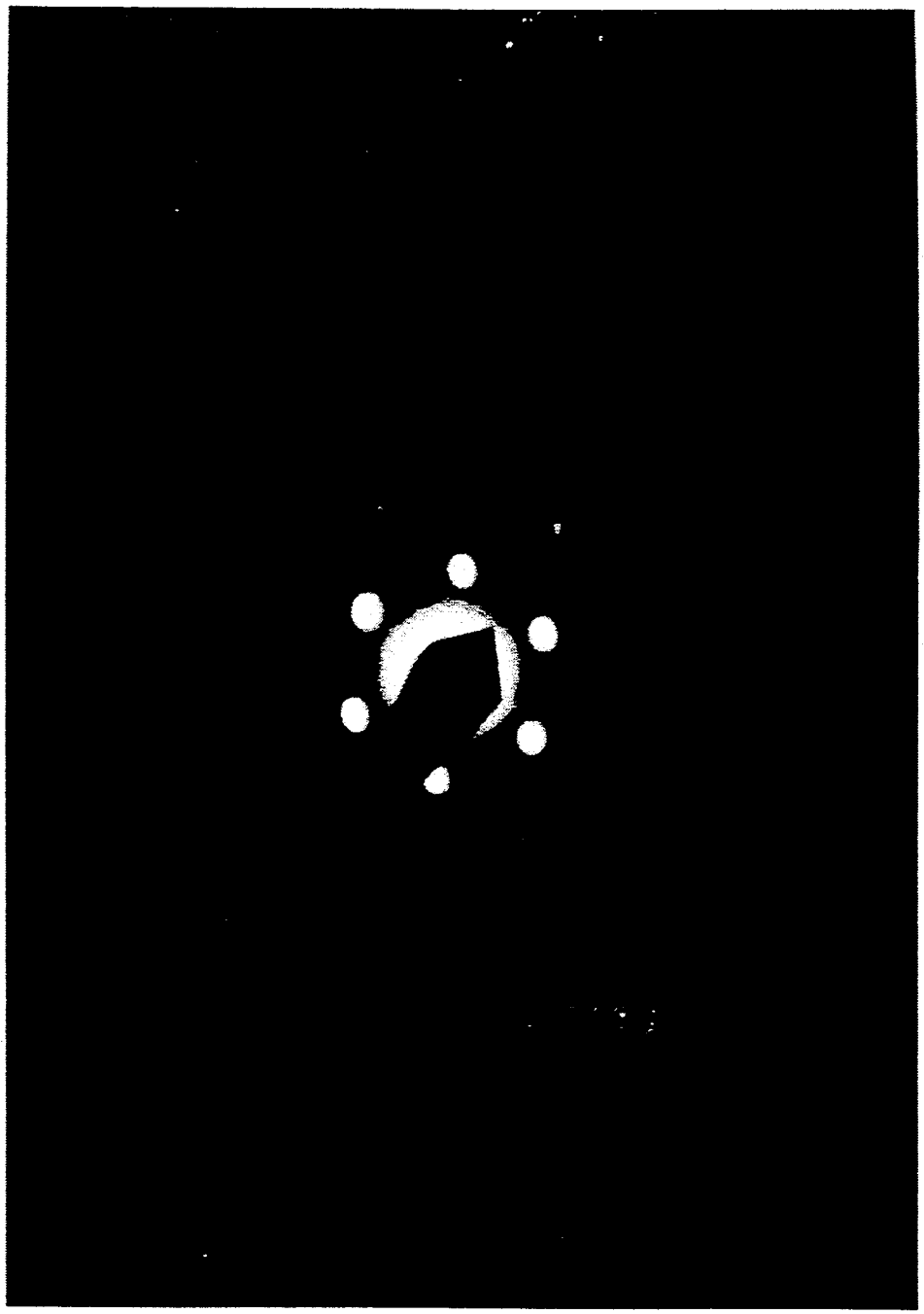
FIG. 18 is an electron diffraction pattern of the product of Example 4.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. An example of a hexagonal pattern from an individual crystal from the product in Example 4 is shown in FIG. 18. The number of diffraction spots observed depends to a degree upon the regularity of the crystalline arrangement in the material, among other things. At the very least, however, the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs discussed below.

Microtomed samples of materials from the Examples were examined by the techniques described above in a JEOL 200 CX transmission electron microscope operated at 200,000 volts with an effective 2 Angstrom objective aperture in place. The instrument has a point-to-point resolution of 4.5 Angstroms. Other experimental arrangements familiar to one skilled in the art of high resolution (phase contrast) TEM could be used to produce equivalent images provided care is taken to keep the objective lens on the underfocus (weak leans) side of the minimum contrast lens current setting. FIG. 19 is an electron micrograph from a microtomed thin section of the crystalline product from Example 4. This micrograph shows a reasonably regular array of large channels in a hexagonal arrangement. The repeat distance between the channels is about 45 Angstrom units, which is consistent with the position of the first peak in the X-ray diffraction pattern (41 Angstroms/$\sqrt{3/2}$) of this material. Since the channels must have walls between them, this observation is also consistent with the estimated pore size of about 39.6 Angstrom units calculated from Argon physisorption measurements of this material in Example 17.

FIG. 20 is an electron micrograph from a microtomed thin section of the crystalline product from Example 5. This micrograph shows a reasonably regular array of somewhat smaller channels in a hexagonal arrangement. The repeat distance between the channels is about 30 Angstrom units, which is consistent with the position of the first peak in the X-ray diffraction pattern (25 Angstroms $\sqrt{3/2}$) of this material. The smaller pore size of this material was also verified by Argon physisorption measurements reported in Example 22(a), where a value of 16.9 Angstrom units was calculated for the material in Example 5.

FIG. 21 is an electron micrograph from a microtomed thin section of the crystalline product from Example 19. The channels in this image are quite large and rather irregular, but the characteristic hexagonal arrangement of the preferred material is evident.

EXAMPLE 24

The M41S materials used in the template removal examples were prepared according to the following synthetic procedure. The specific reactants and quantities are listed below.

160 gm (29%) Cetyltrimethylammonium hydroxide
3.3 gm NaAlO$_2$
80 gm Tentrameyhylammonium Silicate
20 gm Hisil brand Silica The regents were combined while stirring and the pH was adjusted to 12.2 by adding 28 mL of 1M H2SO4. The mixture was stirred for 15 minutes at room temperature and then heated to 105° C. for 4 hours in 600 ml autoclave. The solid products were isolated by filtration and washed with distilled water. The products were found to have a pore diameter of about 30A.

EXAMPLES 25–30

In the following experiments, various washings and ion exchanges were carried out with the intent of removing the organic template. In each case a sample of the synthetic material of Example 24 was contacted with at least 10 volumes of treating solvent and allowed to equilibrate. The treatment was repeated 3 times and the synthetic material was isolated by filtration and analyzed for template content by thermogravimetric analysis. All exchanges were conducted at room temperature except the last example.

|  | Solvent/Co-Solvent | Exchange Reagent | % Template Removed |
|---|---|---|---|
| Example 25 | Water | NH$_4$NO$_3$ | <5 |
| Example 26 | THF |  | <10 |
| Example 27 | Ethyl Ether | HCl | 48 |
| Example 28 | Ethyl Ether/Heptane | HCl | 57 |
| Example 29 | Ethanol/Heptane | HCl | 61 (22° C.) |
| Example 30 | Ethanol/Heptane | HCl | 76 (70° C.) |

Figure 22:
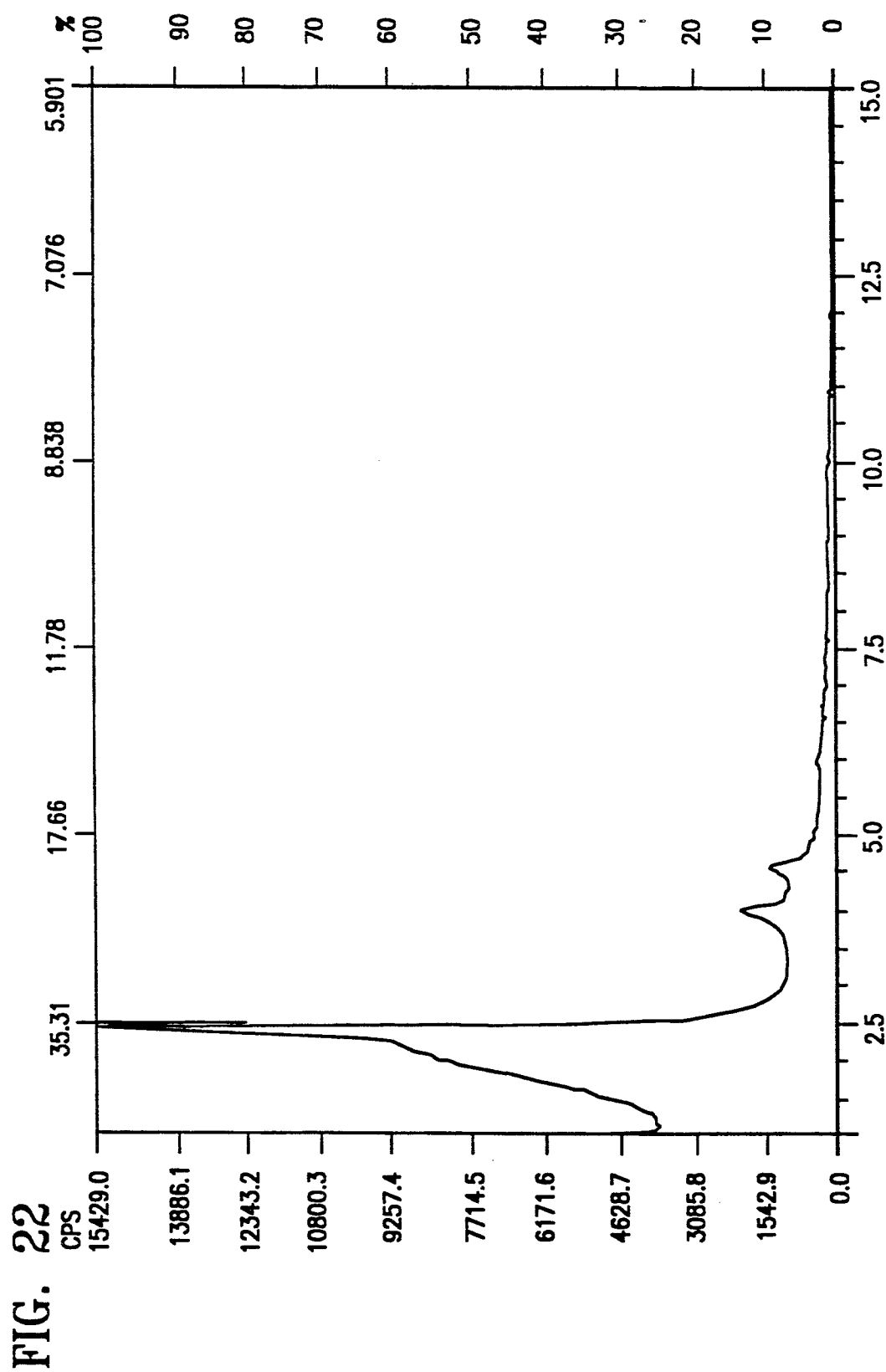
FIG. 22 is an x-ray spectrum of the of the material of Examples 24–29 before solvent treatment.
Figure 23:
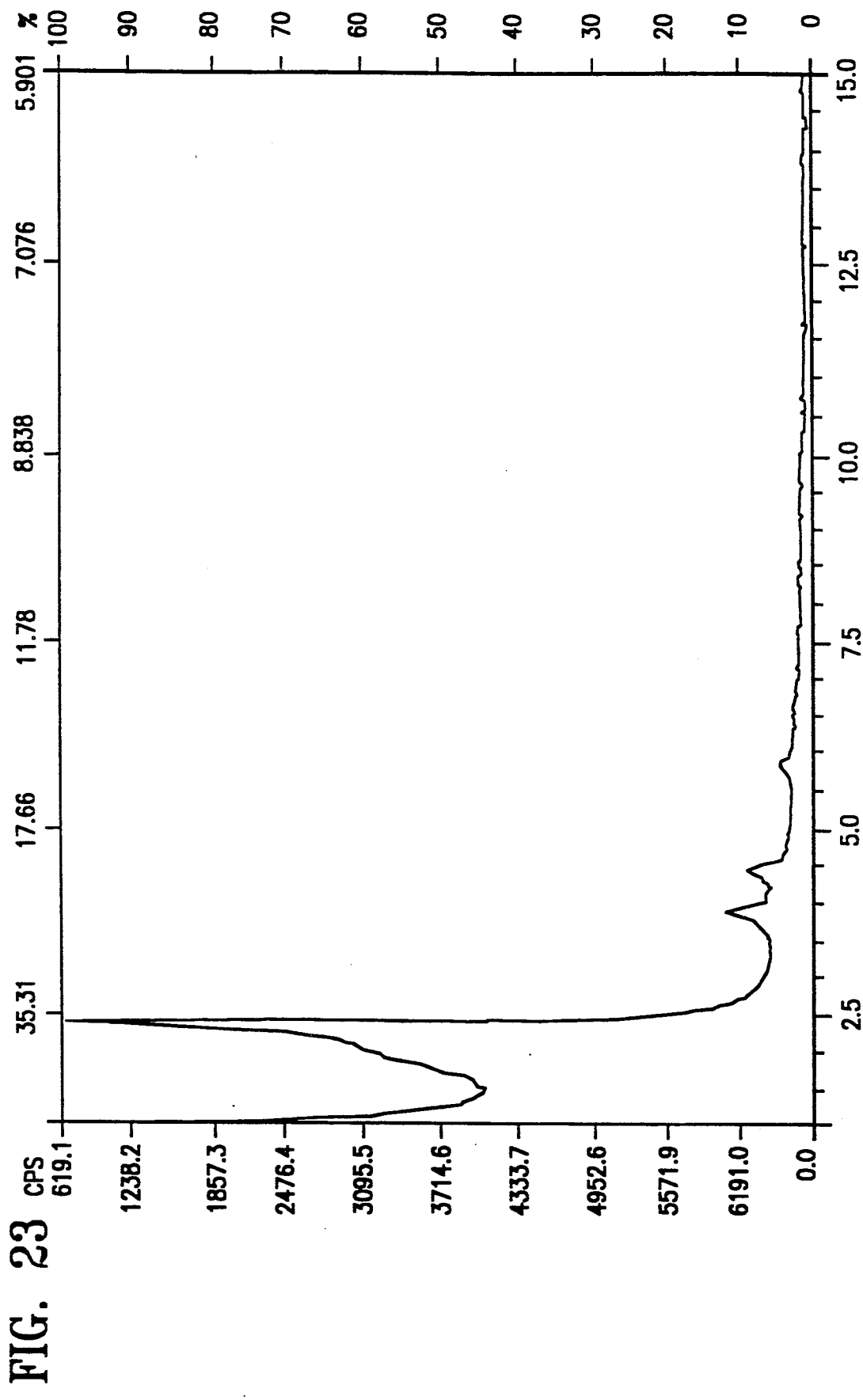
FIG. 23 is an x-ray spectrum of the of the material of Examples 24–29 after solvent treatment showing no structural damage to the starting materials resulting from solvent treatment.
Figure 24:
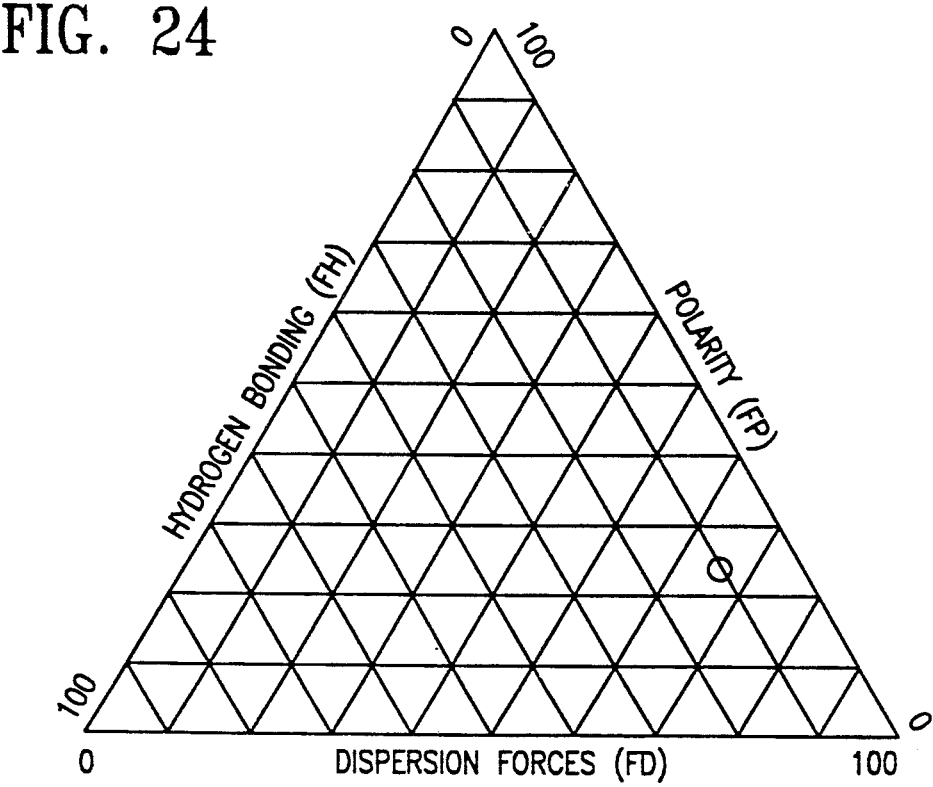
FIG. 24 is a Teas diagram for diethyl ether.
Figure 25:
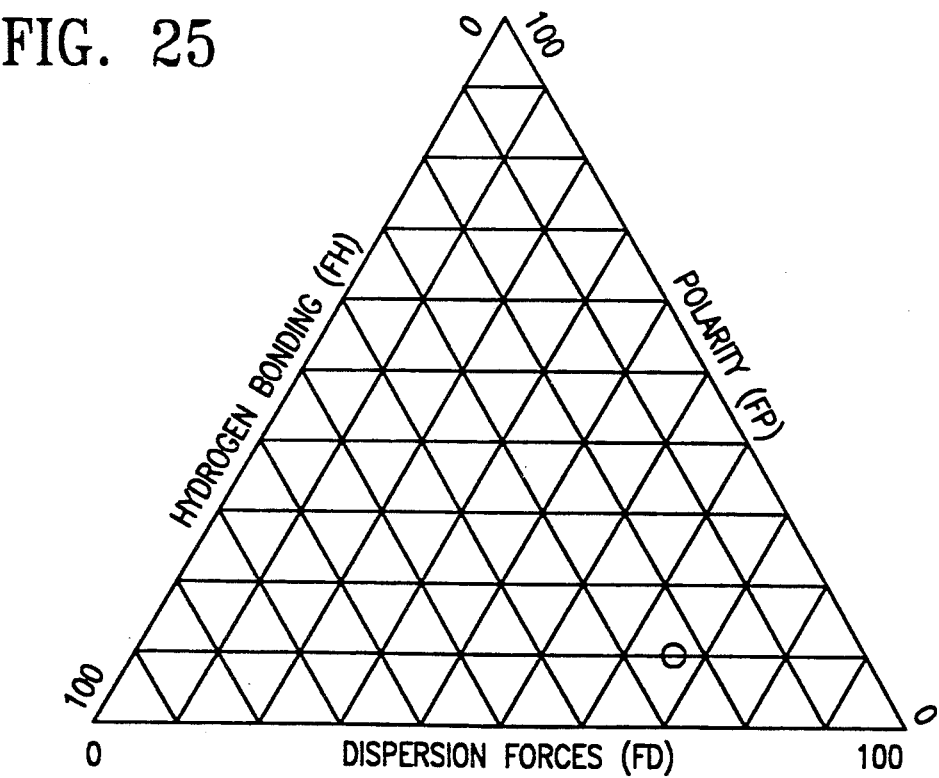
FIG. 25 is a Teas diagram for solvent paramaters for chloroform.
Figure 26:
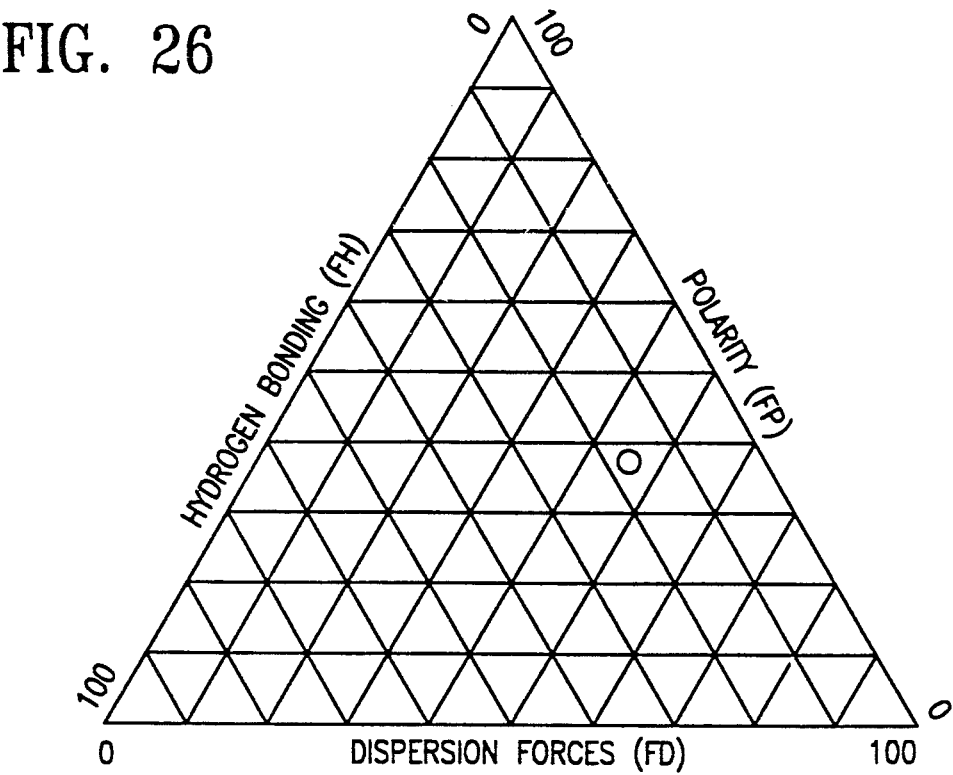
FIG. 26 is a Teas diagram for ethyl acetate.
Figure 27:
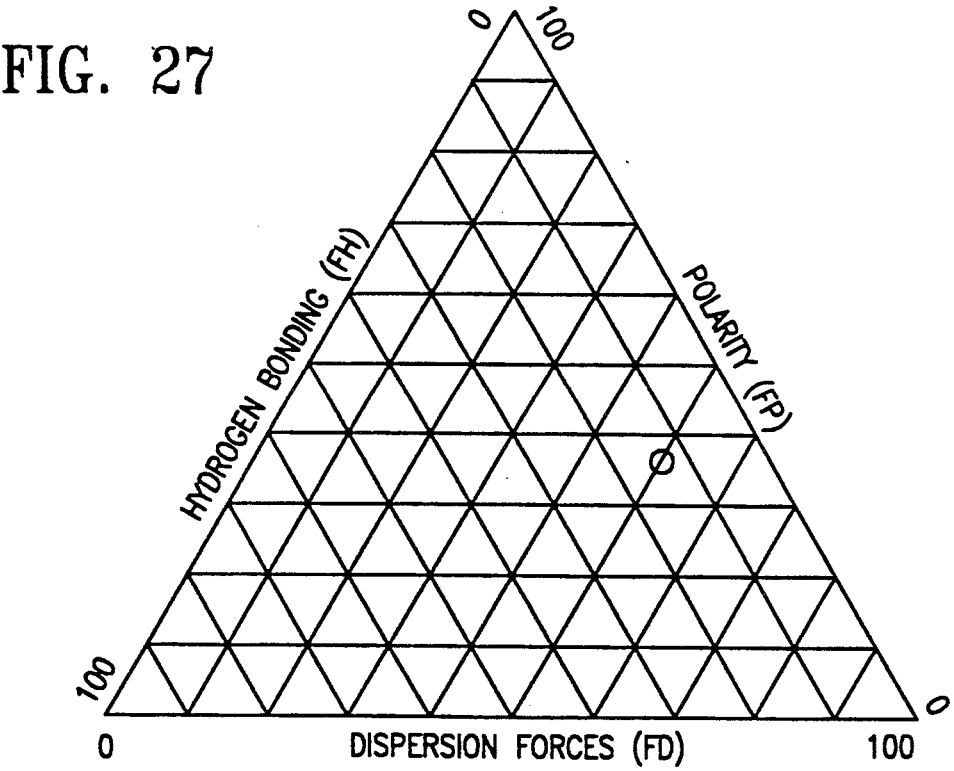
FIG. 27 is a Teas diagram for acetone.
Figure 28:
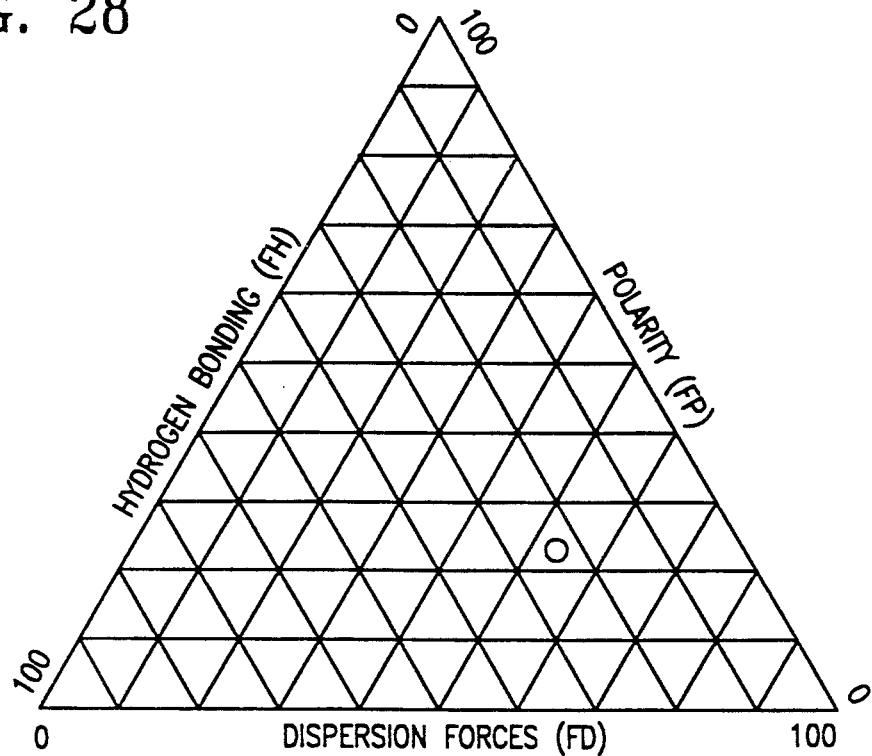
FIG. 28 is a diagram for methanol/benzene azeotrope.
Figure 29:
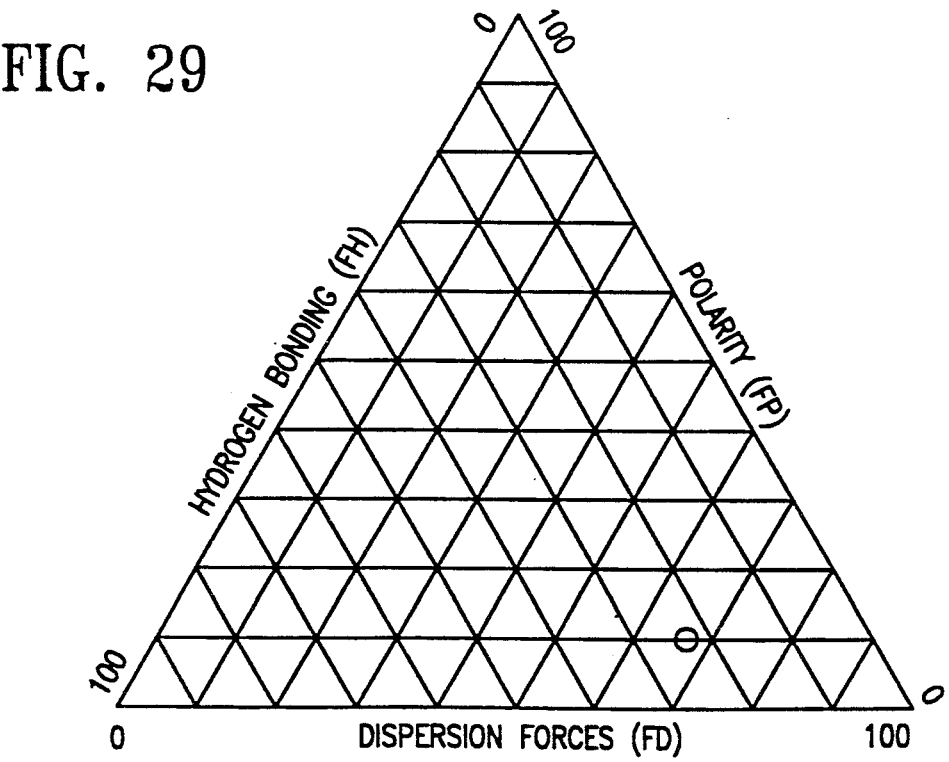
FIG. 29 is a Teas diagram for heptane/ethanol aceotrope
Figure 30:
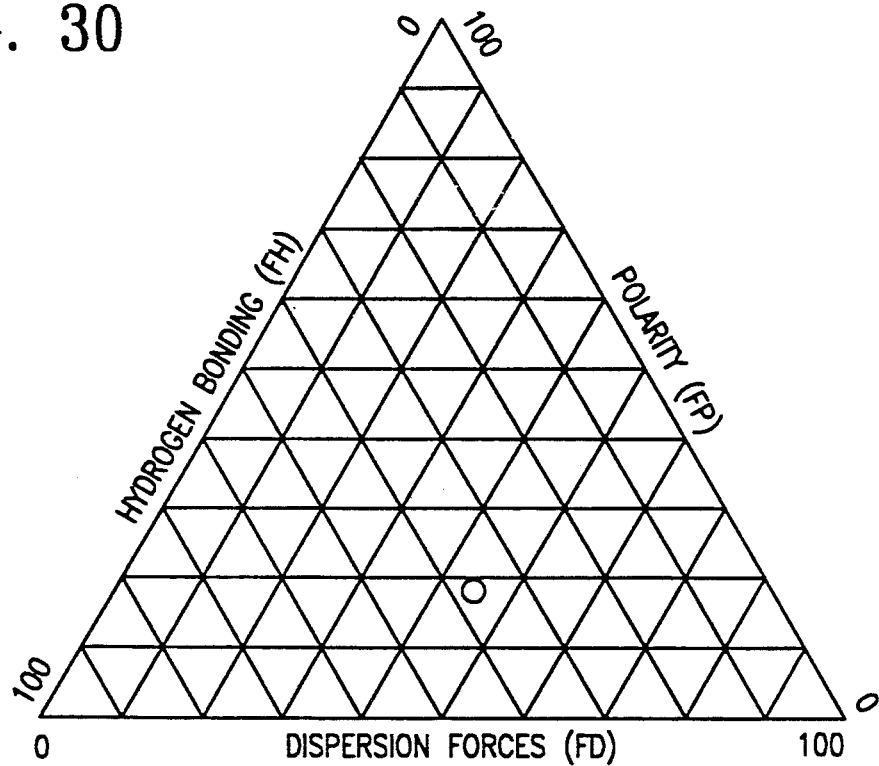
FIG. 30 is a Teas diagram for methanol/toluene azeotrope
Figure 31:
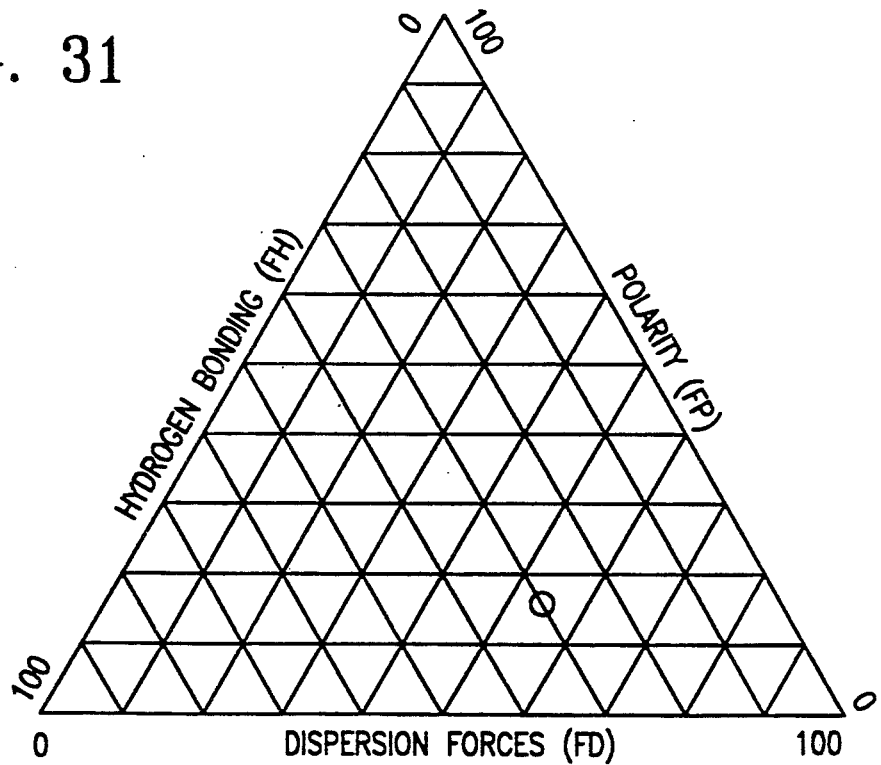
FIG. 31 is a Teas diagram for methanol/trichloroethylene azeotrope.
Figure 32:
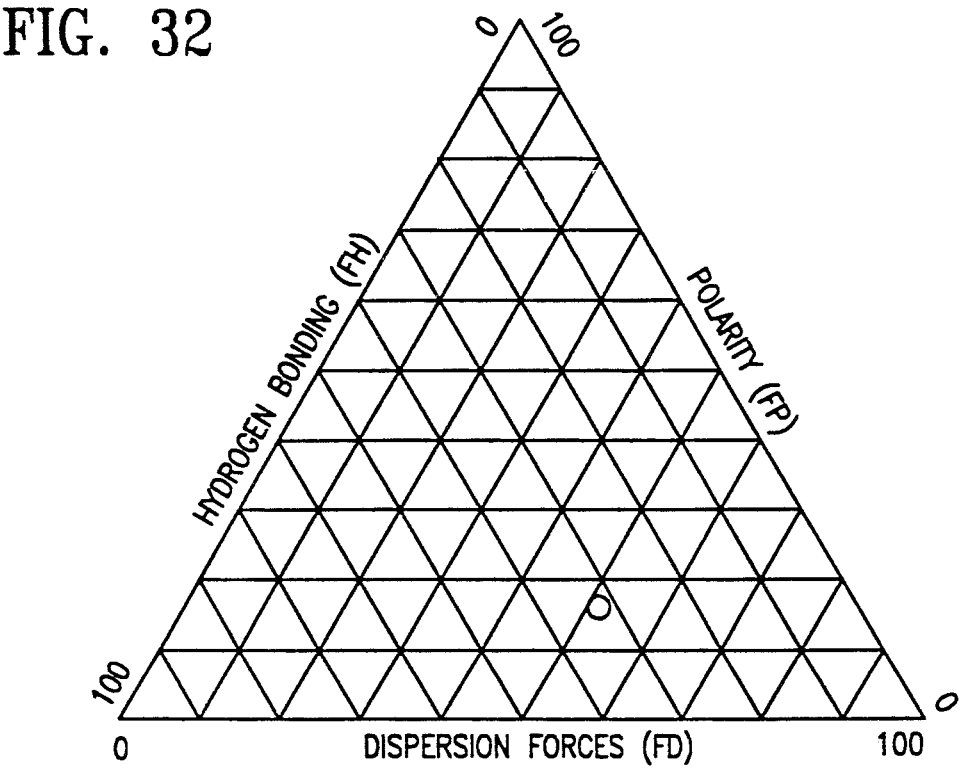
FIG. 32 is a Teas diagram for ethanol/trichloroethylene azeotrope.
Figure 33:
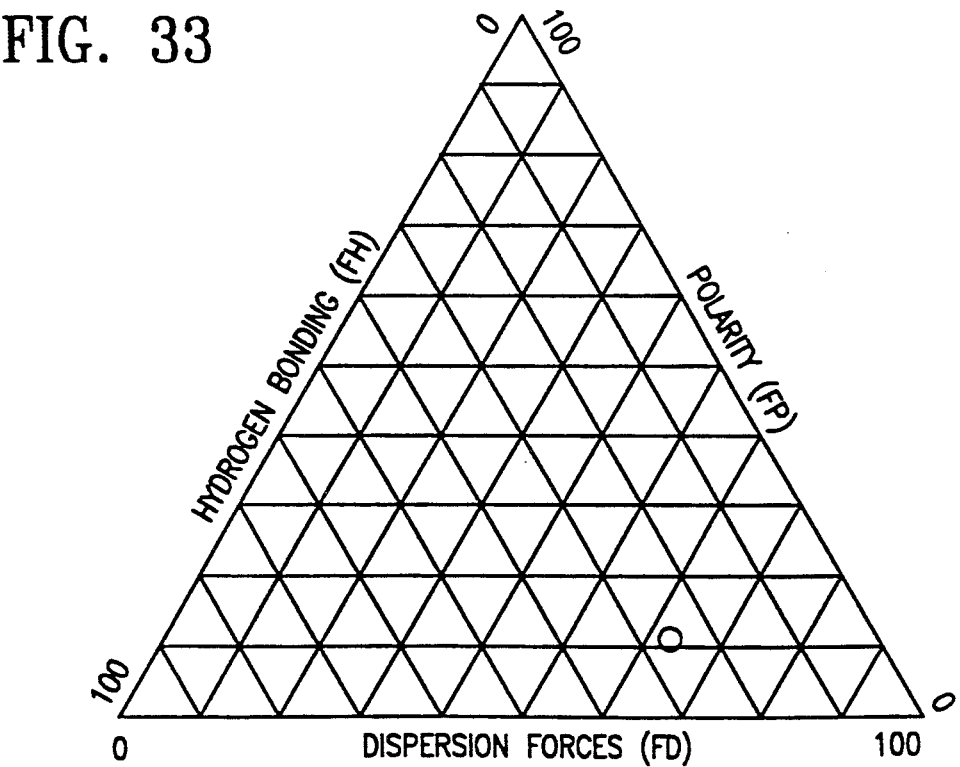
FIG. 33 is a Teas diagram for benzene/ethanol/azeotrope
Figure 34:
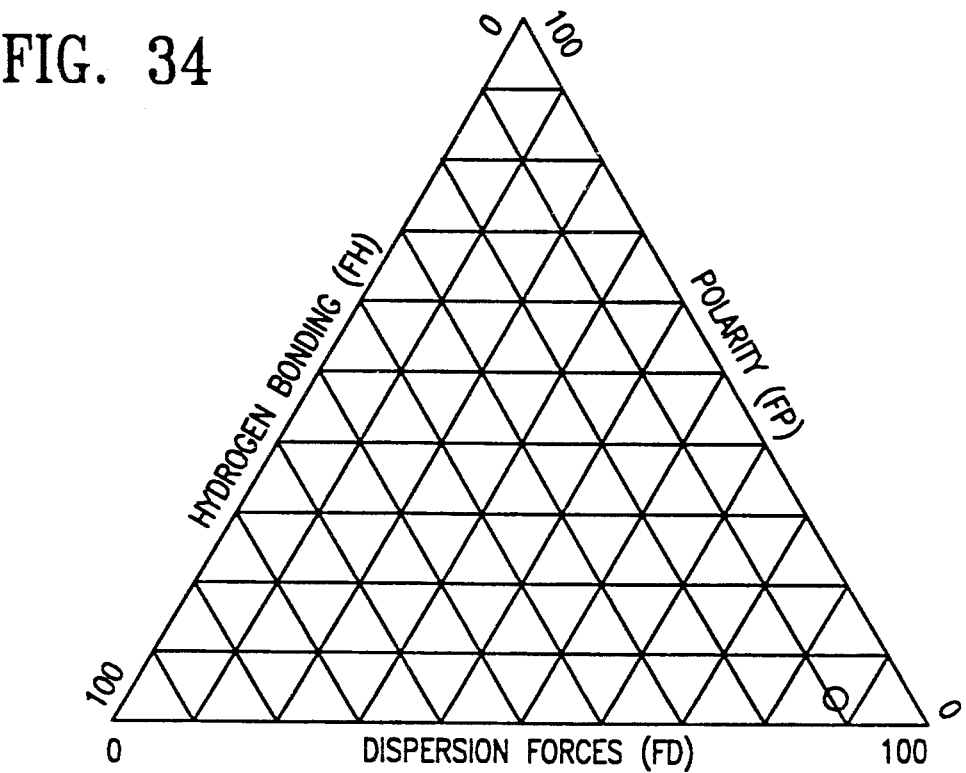
FIG. 34 is a Teas diagram for heptane/n-butyl alcohol azeotrope.
Figure 35:
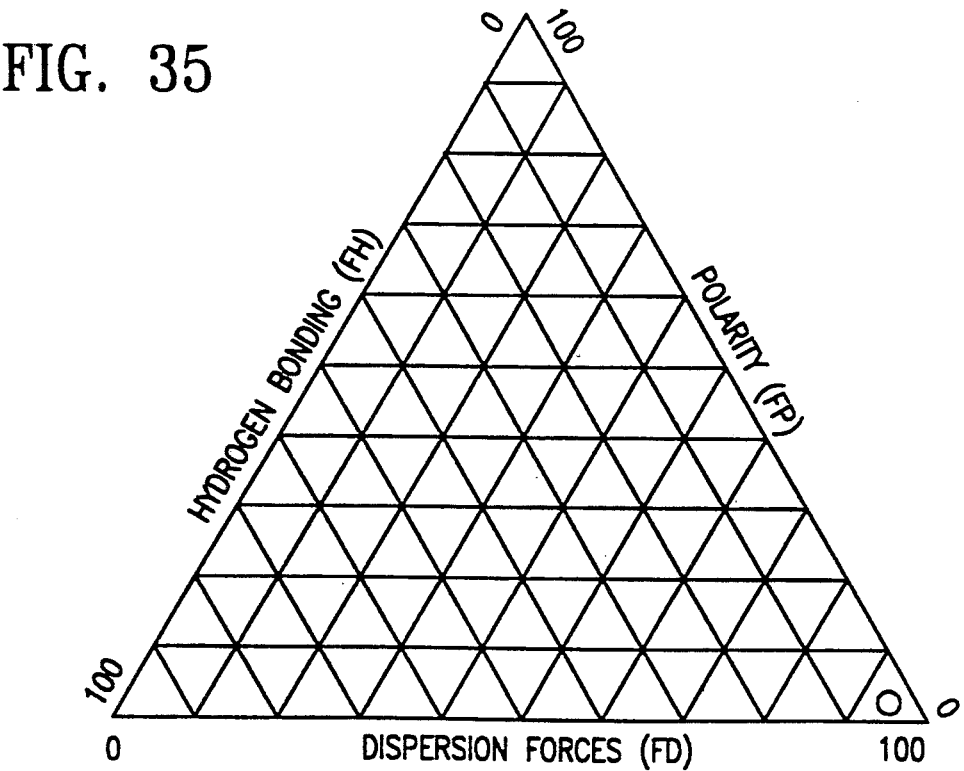
FIG. 35 is a Teas diagram for n-propanol/hexane azeotrope.
Figure 36:
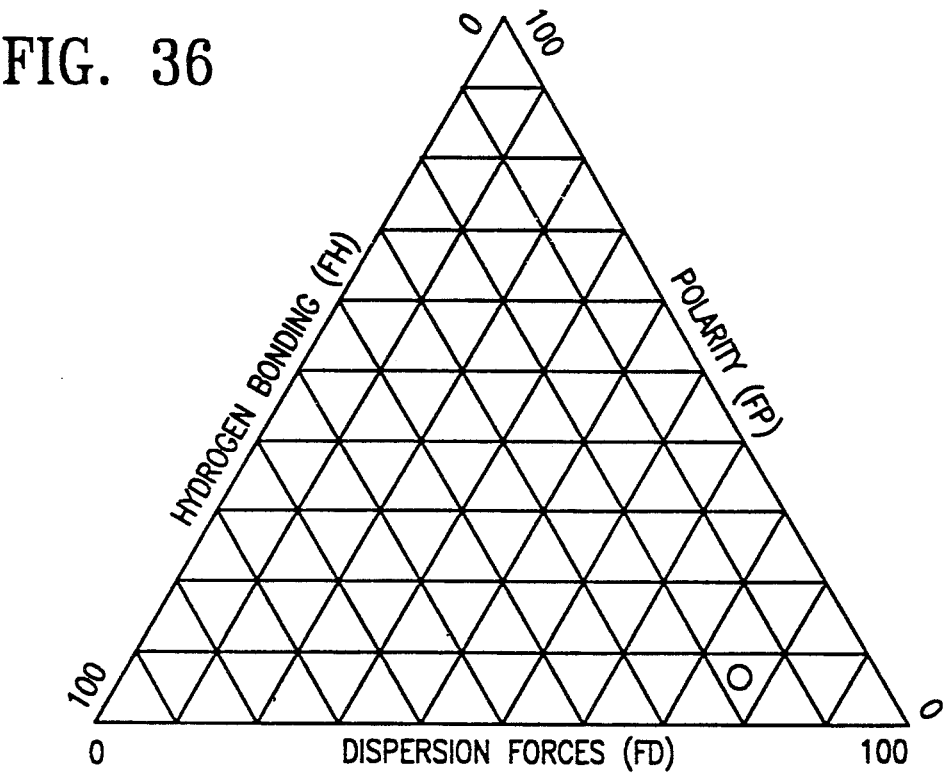
FIG. 36 is a Teas diagram for cyclohexane/i propanol azeotrope.
Figure 37:
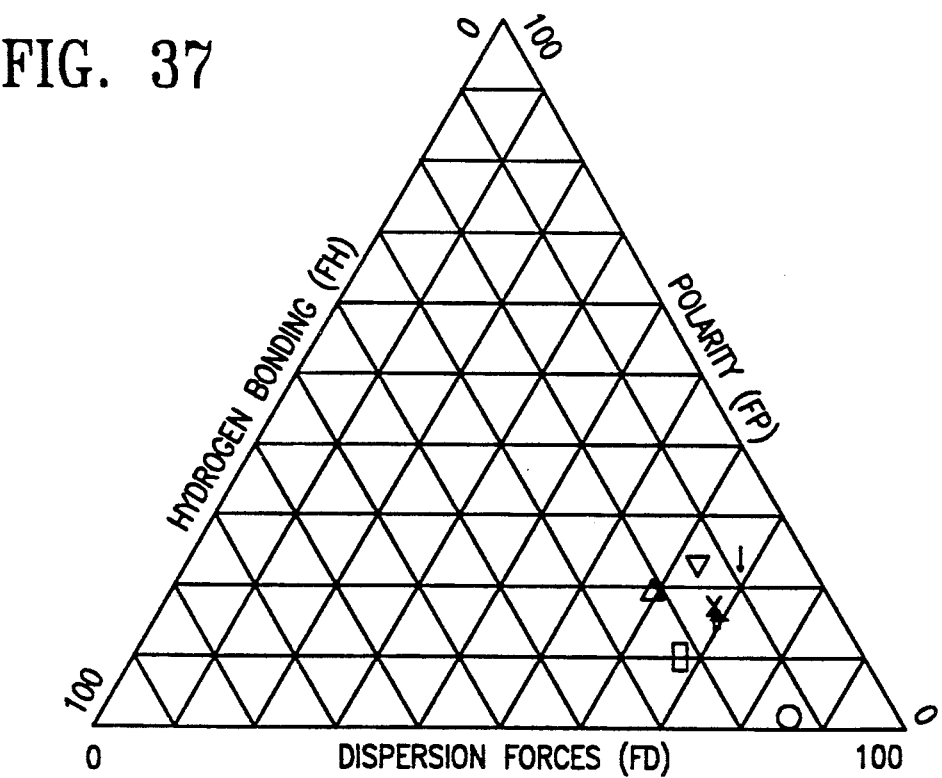
FIG. 37 is a Teas diagram for solvent parameters of chlorides.
Figure 38:
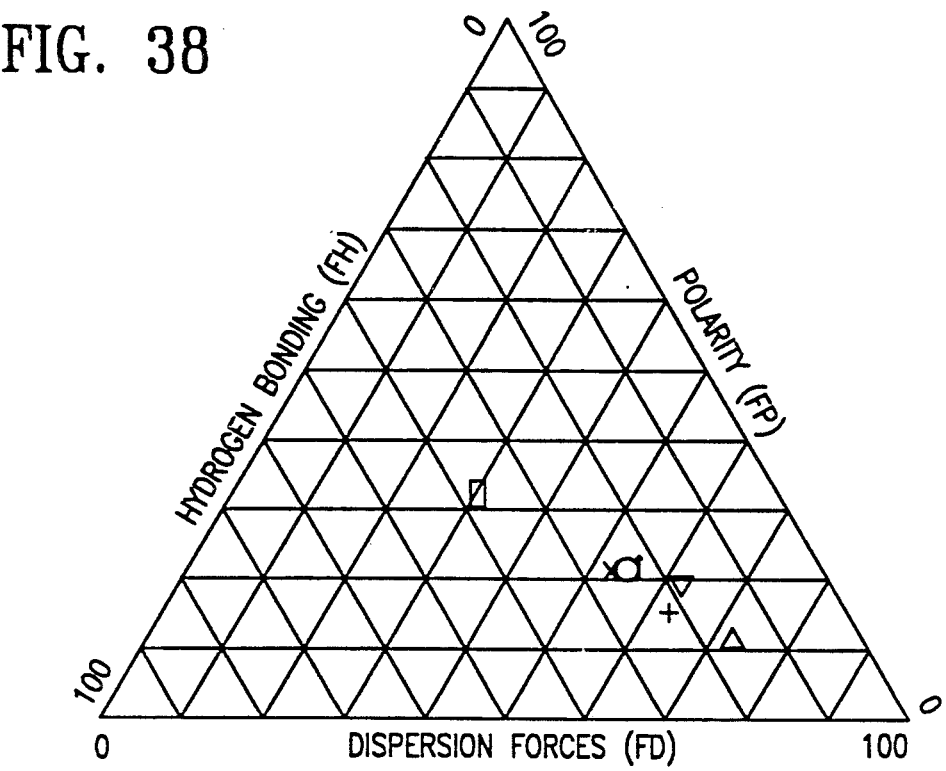
FIG. 38 is a Teas diagram for solubility paramaters For amines.
Figure 39:
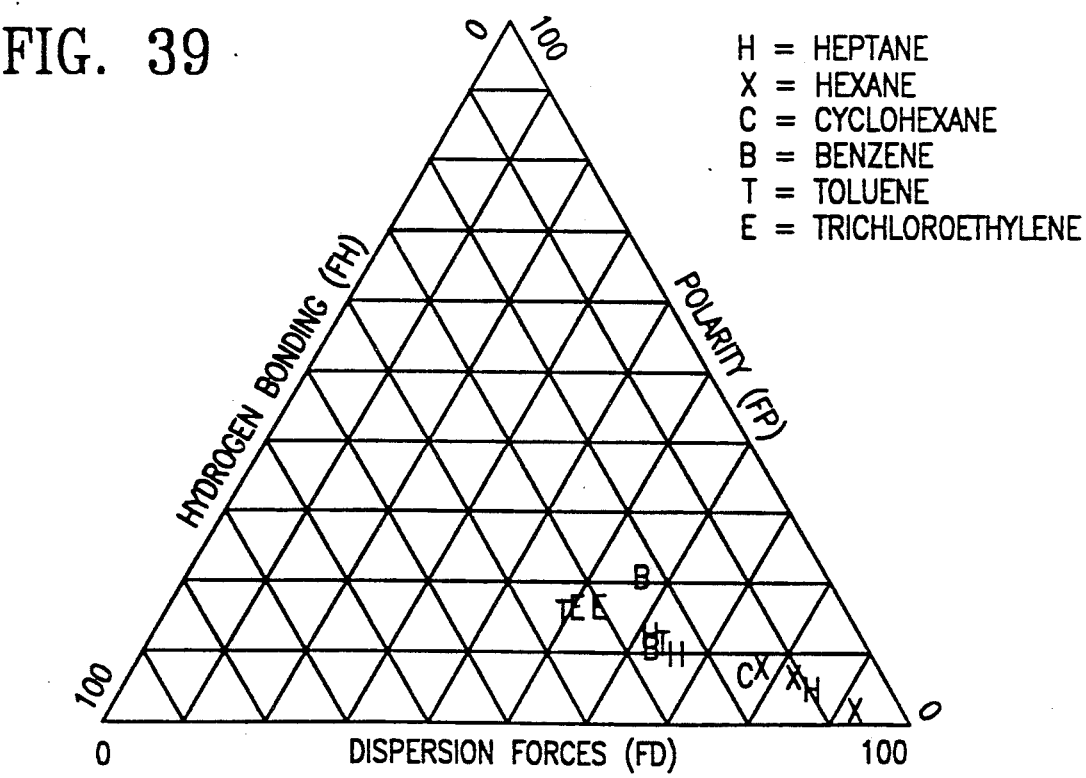
FIG. 39 is a Teas diagram for solvent parameters of alcohol azeotropes.
Figure 40:
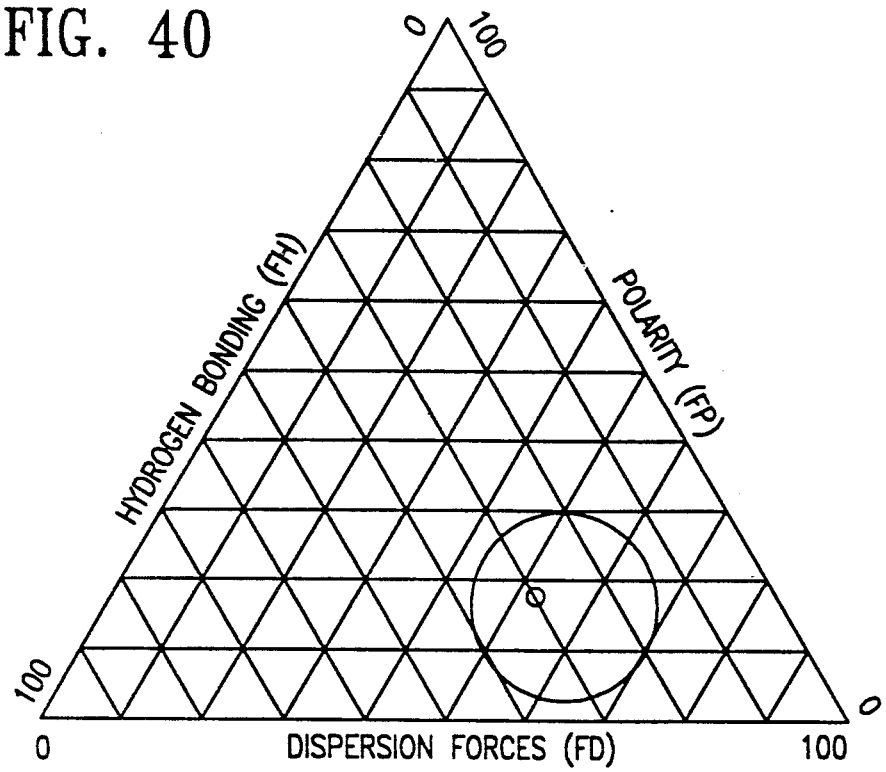
FIG. 40 is a Teas diagram for an acetic acid/chlorobenzene azeotrope.

Note that the x-ray spectra show starting M41S structure (FIG. 22) and that of the last Ethanol/Heptane/HCl treated product (FIG. 23). Clearly, no structural damage to the molecular sieve was induced by this treatment.

EXAMPLE 31

The same M41S material of Example 24 was treated in a continuous hot extractor using refluxing Ethanol/Heptane azeotrope containing 0.15 molar HCl in the liquid phase. After about two days of treatment, the product was analyzed and it was observed that over 90% of the template had been removed from the catalyst.

EXAMPLE 32

In addition to M41S the templates from other as-synthesized materials can be removed using the method of the present invention. MCM-22 is another material which uses an expensive template which is removed by burning because the template cannot be removed by conventional ion-exchange. The preparation and exchange of the uncalcined precursor is given below.

The following reagents were mixed and added to a 300 cc autoclave.

3 58g NaAlO$_2$
1.44 g NaOH
176.00 H$_2$O
30.00g HiSil (silica)
15.17 g Hexamethyleneimine The mixture had pH of 12.5 before reaction. The autoclave was sealed and heated to 170° C. for 17.33 hr. To terminate the reaction the autoclave heater was removed and the reactor immersed in water. The solid product was isolated by filtration and dried at 100° C. The dry product weight was 32.4 g and was identified as product A.

The template of product A was extracted with the technique of this invention by treating 5.0 g of product A three times with a 1.0N HCl solution in 50/50 heptane/ethanol at room temperature. The extracts were combined and evaporated to dryness to yield 0.77 g of hexamethyleneimine hydrocholoride. The dried extracted material was identified as Product B. Thus a substantial amount of the template was removed by this treatment.

To further demonstrate that substantial amounts of the template had indeed been removed by the technique of the present invention, Products A and B were ananlyzed by thermogravametric and elemental analyses. In the case of thermogravanetric analysis, the template content can be inferred by the weight loss at 400° C. due to thermal decomposition of the template and by the total loss on burning the 400° C. decomposed template product in air at 650° C. Some weight loss at above 400° C. is also due to water loss from condensation reactions. Weight loss below 150° C. is due to loss of absorbed water and/or other solvent species. The results of these two analyses are presented in the Table below.

| ANALYSES OF PRODUCTS | | |
|---|---|---|
| OBSERVED (THEORY) | PRODUCT A | PRODUCT B |
| % C (Based on C) | 10.72 (10.72) | 8.34 (8.34) |
| % H | 1.79 (1.79) | 1.38 (1.39) |
| % N | 1.54 (2.08) | 1.01 (1.62) |
| % Al | 2.32 | 2.30 |

| THERMOGRAVAMETRIC ANALYSES | | |
|---|---|---|
| % Wt. Loss, 400 C. (N$_2$) | 9.4 | 6.3 |
| % Wt. Loss, 650 C. (Air) | 16.8 (14.6) | 13.3 (11.3) |

As can be seen by the differences in C,H. and N contents and of the weight losses in thermogravimetric (TGA ananlyses of Products A and B, these results clearly show that a substantial amount of the template was removed by process of the present invention. The data indicate that the aluminum content of the material is not affected by the treatment. It should also be noted that the relative composition of the organic components of both Prodcuts A and B correspond closely to that predicted using the carbon analysis as the reference.

EXAMPLE 33

By adding swelling agents to the synthesis mixture of Example 24, it is possible to enlarge the pore diampeter of the M41S material the synthesis procedure of Example 24 was repeated with the same reagents but 20 g of mesitylene was also added to the autoclave. The resulting M41S product was found have a pore diameter of 60A. In addition to the template, mesitylene was found to be present in the as-synthesized material.

EXAMPLE 34

The efficiency of extraction of a template from the as-synthesized material is believed to be related to several factors. While not to limit the invention by a recitation of theory, one of the most important appears to be the ability of the solvent used for the extraction to solubilize the template or its salt, to interact favorably with the surface and to disrupt olephilic interactions between moieties of templates with each other and with the surface of the material. In accordance with the present invention, it has been found that solvent mixtures characterized by a particular combination of three (3) parameters are unusually efficacious for extracting organic directing agent from an as-synthesized molecular sieve. Such solvent mixtures are described by solvent properties in terms of three parameters; dispersion forces ($f_d$), ($f_d$), polarity ($f_p$) and hydrogen bonding ($f_h$) These parameters have been described in the literature for a wide variety of solvents (J. P. Teas, J. Paint. Tech., Vol.40, No.516, 1968, pp19-25). Desirable solvents can be identified by locating their position on a trilinear plot of the three solvent properties. The solvents which exhibit the similar solubility parameters and thus occur in the same general region of the trilinear plot will be suitable for the present invention. Solubility parameters for mixtures can be predicted in accordance with the present invention, by a linear combination of the parameters of the solvent components. However, the final mixture preferably constitutes a single homogeneous phase.

In the earlier examples a 52/48 mixture of heptane/ethanol was shown to be a particularly good solvent. This mixture has the following solubility parameters: $f_d=67.2$, $f_p=10.2$, $f_h=22.6$. For comparison several other solvents and their corresponding solubility parameters are listed below.

| SOLVENT | $f_d$ | $f_p$ | $f_h$ |
|---|---|---|---|
| Water | 19 | 22 | 58 |
| Methanol | 31 | 23 | 46 |
| Ethanol | 36 | 19 | 45 |
| Benzene | 76 | 7 | 17 |
| Toluene | 78 | 6 | 16 |
| Heptane | 96 | 2 | 2 |
| Diethylether | 67 | 23 | 10 |
| Chloroform | 67 | 10 | 22 |
| Tricholoroethylene | 68 | 12 | 20 |
| 52/48 wt/wt Heptane/EtOH | 67.2 | 10.2 | 22.6 |

It should be noted that diethyl ether has higher polarity and lower hydrogen bonding parameters than the heptane-ethanol mixture and in the previous examples diethyl ether though better than water or alcohol solvents was not as effective as the heptane-ethanol mixture. Choloroform is characterized by parameters almost identical to that of the heptane-ethanol mixture and would therefore be expected to be a good solvent for template exchange. To demonstrate this, 5.0 g of the filtered, air dried (room temperature) M41S product was extracted with chloroform containing 0.6 g HCl/100 cc. After three 1 hr extractions at room temperature with stirring, the template free material was recovered by filtration and dried at 100C. The yield was 2.61 g, thus 48% of the weight of the as synthesized material was removed by the extraction. Recovered extract components were found to consist of mesitylene and chloride salt of the template TGA analyses were then performed on the as synthesized material, the as synthesized material, the as synthesized material fired at 100° C., and the extracted-dried material. The percentage of weight lost at various temperatures are shown below. Note that between 400° C. and 650° C. air was used to burn any remaining organic components in the material.

| Material | Weight lost at temperature | | |
|---|---|---|---|
| | 150° C. | 400° C. | 650° C. |
| As Synthesized Dried at 100 C. | 2 | 46 | 56 |
| Extracted | 5 | 34 | 40 |

These analyses showed that a major portion of the template had been extracted from the material.

EXAMPLE 35

To show the effectiveness of other azeotropic mixtures as extractive solvents for templates, a duplicate experiment to Example 34 was conducted using the benzene/methanol azeotropic mixture (60.5/39.5 wt/wt) as the solvent. Dry HCl was added to the solvent to provide 0.6 g/100 cc as in the above example. Three 50 cc extractions were then carried out o 5.0 g of the as synthesized material of Example 33. The yield of dried extracted material was 1.6 g. TGA analysis of the extracted material as above showed the weight loss at 150C, 400C, and 650C to be 1, 10 and 15% respectively. Thus the Benzene/Methanol azeotrope solvent was more effective than chloroform for this as syntesized material.

EXAMPLE 36

Not all azeotropes have the desired solvation properties. The following table shows the solubility parameters of and composition of a number of common azeotropes.

| SOLVENT | $f_d$ | $f_p$ | $f_h$ |
|---|---|---|---|
| 73/27 Hexane/Methanol | 78 | 8 | 14 |
| 79/21 Hexane/Ethanol | 83 | 6 | 11 |
| 96/4 Hexane/n-Propano | 94 | 2 | 4 |
| 48/52 Heptane/Methanol | 62 | 13 | 25 |
| 52/48 Heptane/Ethanol | 67 | 10 | 23 |
| 82/18 Heptane/n-Butanol | 86 | 4 | 9 |
| 67/33 Cyclohexane/i-PrOH | 76 | 7 | 17 |
| 60/40 Benzene/Methanol | 53 | 21 | 23 |
| 68/32 Benzene/Ethanol | 63 | 11 | 26 |
| 72/28 Toluene/Methanol | 65 | 11 | 24 |
| 68/32 Toluene/Ethanol | 49 | 15 | 36 |
| 64/36 TCE/Methanol | 55 | 16 | 29 |
| 73/27 TCE/Ethanol | 52 | 16 | 33 |

(TCE = Trichloroethylene)

Figure 41:
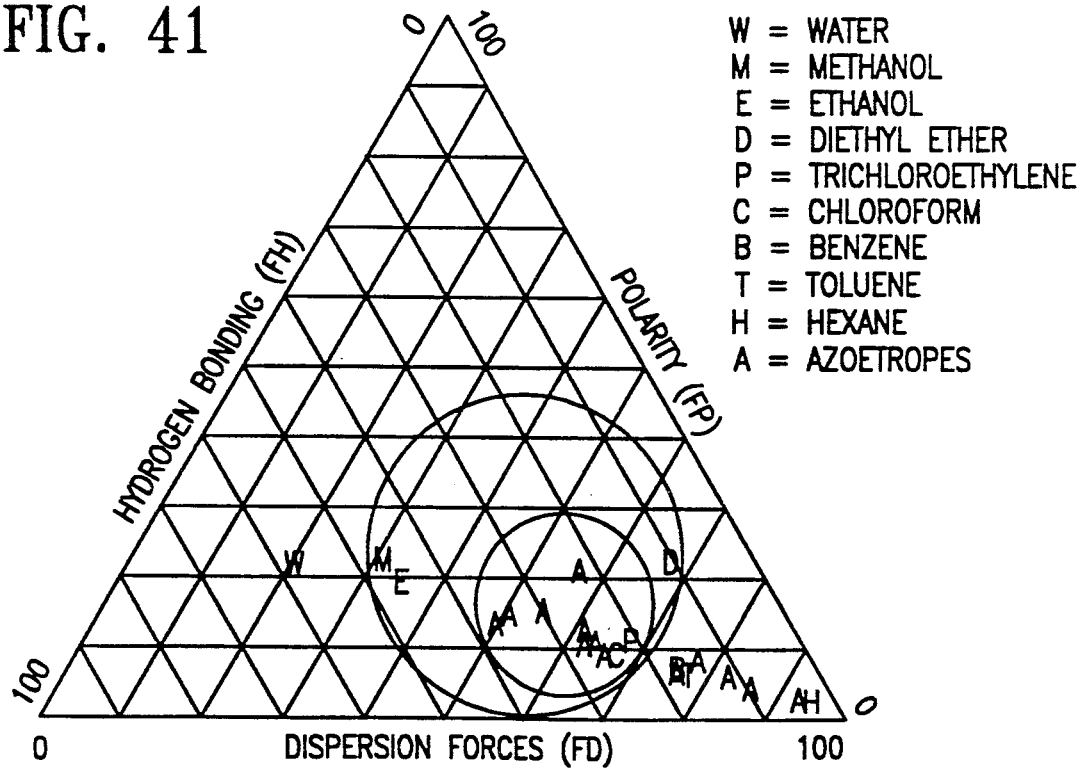
FIG. 41 is a Teas diagram for defining the region of solvent parameters associated with useful and preferred solvents in a accordance with the present invention.

FIG. 41 Shows a typical Teas diagram and the position of a number of solvents on it. The useful and preferred ranges of solubility parameters are identified as a circular area within this triangular diagram. The area of the circles are calculated to encompass a certain percentage of the total triangular area and the center of the circle can be located according to the solubility parameters ($f_d,f_p,f_h$). Alternatively, the center of the circle is located by reading $f_d$ and $f_p$ as coordinates of a standard rectangular graph. The preferred solvent range for our application is one representing 21% of the total area and having a center located at ($f_d=46$, $f_p=22$, $f_h=32$) or if read as rectangular coordinates ($f_d=61$, $f_p=22$). An even more preferred region is expressed as having an area of 7% of the total and having a center located at ($f_d=58$, $f_p=15$, $f_h=27$) or as rectangular coordinates ($f_d=65$, $f_p=15$). These areas are shown in FIG. 41. Many of the azeotropes do not fall within the useful or preferred regions and would therefore not be effective as solvents for template removal. Also shown is the fact that even though diethylether, methanol and ethanol are effective, chloroform, trichloroethylene and several azeotropes would be even more effective.

EXAMPLE 37

As noted above, there are several requirements of a solvent mixture which are believed to be necessary in order for the mixture to be effective in removing templates from as synthesized zeolites. First, as shown in the previous examples, the solvent medium has to have the proper solvent parameters. These properties are believed to allow the solvent to interrupt the Van der Waals interactions between template molecules as well as between templates and the surface of the material. Second, the solvent mixture must be a good solvent for the template whether it be ionic or neutral in nature. Third it is believed that there must be a solvent component that can replace the ionic interactions of the template with the zeolitic hydroxyl groups. These may be strong acids, as is the case of silica-alumina related hydroxyls or they may be weaker acids as is the case of purely silica related hydroxyls. Thus, ion-exchange reactions of templates require an ion for replacement. As in previous examples, a mineral acid such as HCl was added to the mixture to provide a source of protons to replace the template ions. On exchange the anion associated with the mineral acid becomes associated with the template cation in the solvent solution. The extent of exchange in the present invention can sometimes be limited by the availability of exchangeable ions. In this example it is shown that a weakly ionizable acid such as acetic acid can promote some removal of templates but is not as effective as the same solvent containing a highly ionizable inorgnic acid. The solvent used in this example was the azeotropic mixture of acetic acid and chlorobenzene (51.5/48.5 wt/wt). The calculated solvent parameters of this blend places the mixture in the most preferred region of the triangular plot of FIG. 1. 5.0 g as-synthesized M41S catalyst was suspended in 50 cc of the acetic acid/chlorobenzene solvent and heated to 80C. while stirring. After 1 hr, the solids were recovered and washed with additional solvent. Evaporation of the filtrate yielded about 1.6 g of template salts and two additional extractions of the catalyst removed relatively little additional material. The recovered material was washed with additional solvent and finally heptane. A total of 1.65 g of template salts were recovered by the three extractions. TGA analysis of the as synthesized material (dried at 100C. overnight) and the recovered extracted material (dried at 100C. overnight) showed that about one half of the template had been removed by the acetic acid/chlorobenzene solvent (see Table below).

To show the importance of having a highly ionizable inorganic acid in the solvent mixture, the recovered material was further extracted with the same solvent blend (51.5/48.5 acentic acid/chlorobenzend) except that HCl has was dissolved the solvent blend to provide a concentration of 1.25 HCl/100 cc of solvent. The material (2.0 g) was suspended in 25 cc of the solvent and heated to 80-95C. for 1 hr and the solids were recovered by filtration. The solvent on evaporation yielded about 0.4 g of template salt and a second extraction yielded of additional sal. The recovered material was washed with solvent and finally heptane. TGA analysis of this material showed that considerably more template had been removed by the same solvent as above if a strong inorganic acid was also present in the mixture (see the Table below).

| TGA Analyses of Acetic Acid/Chlorobenzene Extracted M41S | | | | |
|---|---|---|---|---|
| | Weight lost at temperature | | | |
| Material | 150° C. | 250° C. | 400° C. | 650° C. |
| As Synthesized (Dried 100 C.) | 1.8 | 19.1 | 38.3 | 46.9 |
| Extracted (HOAc/BxCl) | 0.5 | 2.1 | 16.8 | 27.8 |
| Extracted (HOAc/BxCl/HCl) | 2.7 | 4.3 | 14.2 | 19.1 |

EXAMPLE 38

To show the critically of having an exchangeable ion in the solvent mixture an extraction was carried out using morpholine which has solvent parameters of ($f_d$=53, $f_p$=21, $f_h$=26) and is thus in the preferred solvent property range. However, no exchangeable ion was added to the temperature for 80 hr. The solids were recovered by filtration and then washed with chloroform and with diethyl ether then dried at 100C. overnight. TGA analysis of the recovered solids was found to be essentially identical to that of the parent untreated material, thus no exchange occurred.

EXAMPLE 39

To show the critically of having an exchangeable ion in the solvent mixture an extraction was carried out using morpholine which has solvent parameters of ($f_d$=53, $f_p$=21, $f_h$=26) as in Example 39 but in this Example 1.5 g of ammonium chloride was added. M41S (2.0 g) was suspended in 100 g of morpholine/ammonium chloride and was reacted at 65° C. for about 1 hr. The solids were recovered by filtration and the process was repeated a second time. The final product was then washed with chloroform and with diethyl ether then dried at 100C. overnight. TGA and elemental analyses of the recovered solids gave the following results.

| ANALYSES OF PRODUCTS | | |
|---|---|---|
| | STARTING M41S | EXCHANGED M41S2 |
| ELEMENTAL ANALYSES | | |
| % C | 35.4 | 12.15 |
| % H | 7.2 | 3.30 |
| THERMOGRAVIMETRIC ANALYSES NORMALIZED TO 100 G ASH | | |
| Gr. WT. LOSS, 400 C. ($N_2$) | 83.9 | 23.6 |
| Gr. Wt. LOSS (Air) | 104.3 | 34.0 |

These results show that around 70% of the organic material in the as synthesized material (template) are removed by this extraction procedure whereas in Example 38 essentially no template was removed. Thus, effective extractions require both exchangeable ions and solvents with the proper solubility parameters.

EXAMPLE 40

In this Example, an MCM-22 prepared in a similar manner to that of Example 32 was treated with another exchange reagent. In this case the solvent was the azeotropic mixture of benzene and methanol (60/40 wt/wt) containing 0.6 g of dry HCl/100 cc solvent. About 0.5 g of the material was suspended in the exchange reagent and allowed to stand at room temperature overnight. The solids were recovered by filtration and the procedure repeated. The final product solids were washed with benzene/methanol and dried in an oven at 100C. The starting materials and products were then analyzed by thermogravimetric analysis with the following results.

| THERMOGRAVIMETRIC ANALYSES NORMALIZED TO 100 G ASH | | |
|---|---|---|
| | STARTING MCM-22 | EXCHANGED MCM-22 |
| Gr. Wt. LOSS, 400° C. ($N_2$) | 12.0 | 6.7 |
| Gr. Wt. LOSS, 650° C. (Air) | 20.9 | 15.1 |

With this material much of the weight loss above 400° C. is due to water loss due to surface hydroxyl condensation. Thus these results show that about 45% is due to water loss due to surface hydroxyl condensation. Thus these results show that about 45% of the organic material (loss at 100°-400° C.) in the as synthesized material is easily removed with this procedure.

Changes and modifications in the specifically described embodiments can be carried out without departing from the scope of the invention which is intended to be limited only by the scope of the appended claims.

What is claimed is:

1. A method for removing a templating agent from a porous synthetic material having said templating agent sorbed within pores of said synthetic material comprising:
   (a) contacting said porous synthethic material with polar solvent having dissolved therein at least one cation donor, wherein said polar solvent is characterized by Solubility parameters $f_d$, $f_p$, and $f_h$ wherein the values of solubility parameters $f_d$, $f_p$, and $f_h$ are defined by a circular region of the Teas diagram of FIG. 41, said circular region having a center defined by the coordinates ($f_d=46$, $f_p=22$, $f_h=32$) and encompassing about 21 percent of the total area of said Teas diagram in FIG. 41, and wherein each of said sorbed templating agent and said cation donor are soluble in said polar solvent; and
   (b) holding said porous synthetic material, said nonaqueous polar solvent, and said cation donor of step (a) in contact at elevated temperature for a period of time sufficient to desorb at least a portion of said templating agent from said synthetic material.

2. The method of claim 1 wherein said circular region has a center defined by the coordinates ($f_d=58$, $f_p=15$, $f_h=27$) and wherein said circular region encompasses about 7 percent of the total area of said Teas diagram.

3. The method of claim 1 wherein said cation donor comprises an inorganic acid or salt of said inorganic acid.

4. The method of claim 1 wherein said polar solvent is selected from the group consisting of aromatic or aliphatic ethers, alcohols, amines, esters halogenated hydrocarbons, and carboxylic acids.

5. The method of claim 3 wherein said cation donor comprises an ammonium salt.

6. The method of claim 1 wherein the temperature is at least 70° C.

7. A method for removing a directing agent from a porous synthetic crystalline material having said templating agent sorbed within pores of said synthetic material comprising:
   (a) contacting said porous synthethic material with polar solvent having dissolved therein at least one cation donor, said polar solvent characterized by solubility parameters $f_d$, $f_p$, and $f_h$ which are defined by the area of the larger circle of the Teas diagram of FIG. 41, wherein each of said sorbed templating agent and said cation donor are soluble in said extraction solvent; and
   (b) holding said porous synthetic material, said extraction solvent, and said cation donor of step (a) in contact at elevated temperature for a period of time sufficient to desorb at least a portion of said templating agent from said synthetic material.

8. The method of claim 7 wherein said polar solvent is characterized by solubility parameters which are defined by the smaller circle of the Teas dia gram of FIG. 41.

9. The method of claim 7 wherein the pH of said extraction solvent is less than about 7.

10. The method of claim 7 wherein said temperature is above 70° C.

11. The method of claim 7 wherein said cation donor comprises an inorganic acid or salt of said inorganic acid.

12. The method of claim 7 wherein said polar solvent is selected from the group consisting of aromatic or aliphatic ethers, alcohols, amines, halogenated hydrocarbons, and carboxylic acids.

13. The method of claim 7 wherein said cation donor comprises an ammonium salt.

14. The method of claim 7 wherein said polar solvent comprises an azeotropic mixture of at least two components.

15. The method of claim 14 wherein said components comprise heptane and ethanol.

16. The method of claim 15 wherein heptane and ethanol are present in approximately equal weights.

17. The process of claim 7 further comprising separating said polar solvent from extracted templating agent and recycling recovered polar solvent to said contacting step (a).

18. The process of claim 17 further comprising separating said cation donor from extracted templating agent and recycling recovered cation donor to said contacting step (a).

19. A method for removing a directing agent from a porous synthetic material comprising an inorganic, porous, non-layered crystalline phase material exhibiting, after calcination, an X-ray diffraction pattern with at least one peak at a d-spacing greater than about 18 Angstrom Units with a relative intensity of 100, and a benzene adsorption capacity of greater than 15 grams benzene per 100 grams of said material at 50 torr and 25° C., said porous synthetic material having said templating agent sorbed within pores of said synthetic material, said recovery method comprising:
   (a) contacting said porous synthethic material with polar solvent having dissolved therein at least one cation donor, said polar solvent characterized by solubility parameters $f_d$, $f_p$, and $f_h$ which are defined by the area of the larger circle of the Teas diagram of FIG. 41, wherein each of said sorbed templating agent and said cation donor are soluble in said extraction solvent; and
   (b) holding said porous synthetic material, said extraction solvent, and said cation donor of step (a) in contact at elevated temperature for a period of time sufficient to desorb at least a portion of said templating agent from said synthetic material.

20. The method of claim 19 wherein said polar solvent is selected from the group consisting of aromatic or aliphatic ethers, alcohols, amines, halogenated hydrocarbons, and carboxylic acids.

21. The method of claim 19 wherein said cation donor comprises an ammonium salt.

22. The method of claim 19 wherein said polar solvent comprises an azeotropic mixture of at least two components.

23. The method of claim 22 wherein said components comprise heptane and ethanol.

24. The method of claim 23 wherein heptane and ethanol are present in approximately equal weights.

25. The process of claim 19 further comprising separating said polar solvent from extracted templating agent and recycling recovered polar solvent to said contacting step (a).

26. The process of claim 25 further comprising separating said cation donor from extracted templating agent and recycling recovered cation donor to said contacting step (a).

* * * * *

UNITED STATES PATENT AND TRADEMARK OFFICE
CERTIFICATE OF CORRECTION

PATENT NO. : 5,143,879

DATED : September 1, 1992

INVENTOR(S) : D. D. Whitehurst

It is certified that error appears in the above-identified patent and that said Letters Patent is hereby corrected as shown below:

Claim 8, column 45, line 63, "dia gram" should read --diagram--

Signed and Sealed this

Nineteenth Day of October, 1993

Attest:

BRUCE LEHMAN

Attesting Officer

Commissioner of Patents and Trademarks